(12) United States Patent
Shimizu

(10) Patent No.: US 7,881,856 B2
(45) Date of Patent: Feb. 1, 2011

(54) APPARATUS FOR AND METHOD OF CONTROLLING FUEL INJECTION OF ENGINE

(75) Inventor: Hirokazu Shimizu, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/416,569

(22) Filed: Apr. 1, 2009

(65) Prior Publication Data
US 2009/0254263 A1 Oct. 8, 2009

(30) Foreign Application Priority Data
Apr. 3, 2008 (JP) ............................. 2008-097013
May 22, 2008 (JP) ............................. 2008-133957

(51) Int. Cl.
*F02B 3/10* (2006.01)
(52) U.S. Cl. ...................... 701/104; 701/110; 123/299; 123/90.15
(58) Field of Classification Search ................. 123/299, 123/300, 90.15, 345–348, 305, 436, 492, 123/493; 701/103–105, 110
See application file for complete search history.

(56) References Cited

U.S. PATENT DOCUMENTS

| | | | | |
|---|---|---|---|---|
| 5,685,276 A * | 11/1997 | Tanaka et al. | ................ | 123/478 |
| 6,062,201 A * | 5/2000 | Nozawa et al. | ............... | 123/478 |
| 6,425,357 B2 | 7/2002 | Shimizu et al. | | |
| 6,425,369 B2 * | 7/2002 | Arai et al. | ................... | 123/348 |
| 6,659,054 B2 * | 12/2003 | Sugiyama et al. | ........ | 123/90.16 |
| 6,681,741 B2 * | 1/2004 | Majima et al. | ............... | 123/399 |
| 6,840,201 B2 | 1/2005 | Miura | | |
| 6,851,409 B2 | 2/2005 | Machida et al. | | |
| 7,124,734 B2 * | 10/2006 | Almkvist et al. | ............ | 123/299 |
| 7,168,402 B2 * | 1/2007 | Takemura et al. | ......... | 123/90.15 |
| 7,398,749 B2 * | 7/2008 | Weiss et al. | ............... | 123/90.16 |
| 7,520,261 B2 * | 4/2009 | Saruwatari et al. | .......... | 123/305 |
| 7,565,899 B2 * | 7/2009 | Kolmanovsky et al. | ..... | 123/481 |
| 7,693,646 B2 | 4/2010 | Moriya | | |
| 2001/0003971 A1 | 6/2001 | Hori et al. | | |
| 2009/0088948 A1 * | 4/2009 | Nakagawa et al. | .......... | 701/103 |

FOREIGN PATENT DOCUMENTS

| | | |
|---|---|---|
| JP | 7-310577 A | 11/1995 |
| JP | 2001-173471 A | 6/2001 |
| JP | 2001-263015 A | 9/2001 |
| JP | 2003-184516 A | 7/2003 |
| JP | 2003-184587 A | 7/2003 |
| JP | 2003-269124 A | 9/2003 |
| JP | 2004-108259 A | 4/2004 |

(Continued)

*Primary Examiner*—Hai H Huynh
(74) *Attorney, Agent, or Firm*—Foley & Lardner LLP

(57) ABSTRACT

An apparatus for and a method of controlling a fuel injection in which, in fuel injection control of an engine including a variable valve mechanism that can change an inlet valve opening characteristic, when an intake air amount is changed by an operation of the variable valve mechanism after the fuel injection valve performs first injection, a fuel amount corresponding to the change in intake air amount is injected in second injection after the first injection, and the sum of the fuel amount injected in the first injection and the fuel amount injected in the second injection becomes a fuel amount corresponding to an intake air amount fixed at an inlet valve closing timing.

19 Claims, 37 Drawing Sheets

FOREIGN PATENT DOCUMENTS

| | | | |
|---|---|---|---|
| JP | 2005-188293 A | 7/2005 | |
| JP | 2005-248883 A | 9/2005 | |
| JP | 2006-144644 A | 6/2006 | |
| JP | 2006-348865 A | 12/2006 | |
| JP | 2007-120339 A | 5/2007 | |
| JP | 2007-332944 A | 12/2007 | |
| JP | 2008-25541 A | 2/2008 | |
| JP | 2009-281275 | * 12/2009 | |

* cited by examiner

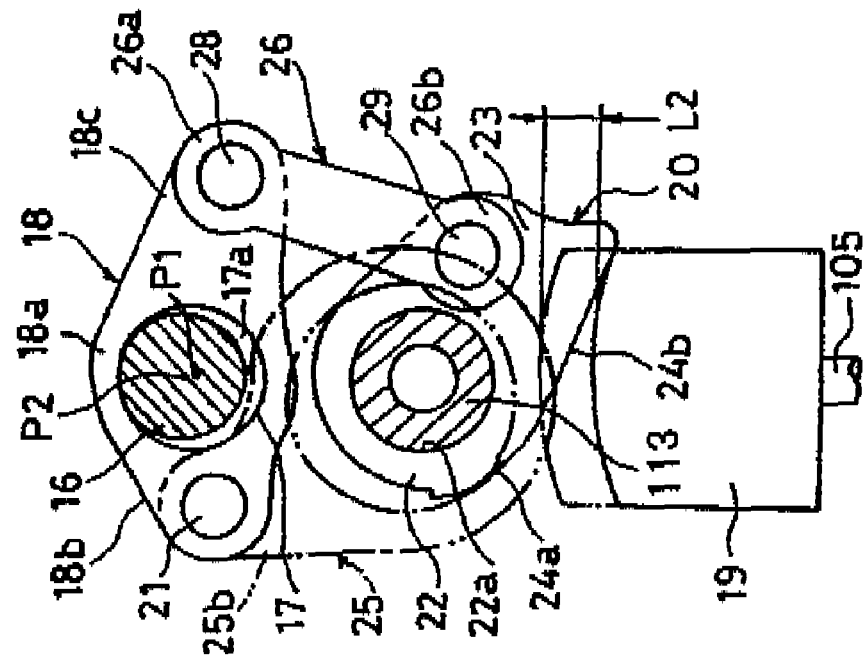
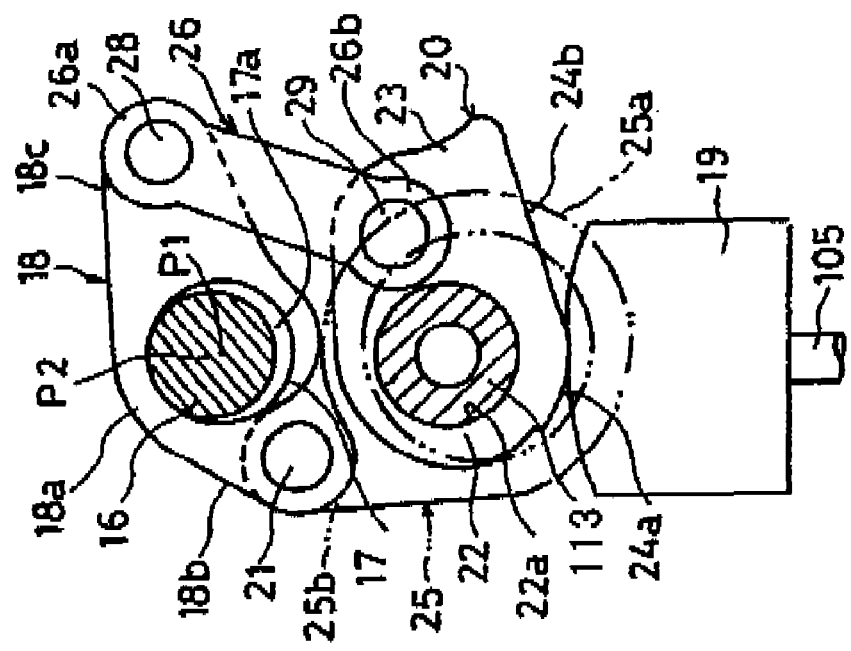

APPARATUS FOR AND METHOD OF CONTROLLING FUEL INJECTION OF ENGINE

BACKGROUND OF THE INVENTION

1. Field of the Invention

The present invention relates to an apparatus for and a method of controlling a fuel injection control, applied to an engine provided with a variable valve mechanism, which varies an opening characteristic of an inlet valve.

2. Description of the Related Art

Japanese Laid-Open (Kokai) Patent Application Publication No. 2005-248883 discloses an engine provided with a first injection valve that injects fuel into an inlet passage on an upstream side of an inlet valve, a second injection valve that directly injects fuel into a cylinder, and a variable valve mechanism that changes a lift amount and/or valve timing of the inlet valve.

This publication further discloses the technique that, as the lift amount of the inlet valve is decreased and/or as a valve-opening time of the inlet valve is delayed from an inlet top dead center, a ratio of an amount of fuel injected from the first injection valve to a total fuel injection amount is decreased, and a ratio of an amount of fuel Injected from the second injection valve to the total fuel injection amount is increased.

In the case where an intake air amount is controlled by the variable valve mechanism, because an inlet-valve opening characteristic is gradually changed in a transient state even after the opening timing of the inlet valve is started, the intake air amount in the intake stroke is decided and fixed at the point of closing timing of the inlet valve.

On the other hand, in order to enhance homogeneity of an air fuel mixture, it is necessary to inject the fuel in an earlier timing.

Therefore, a lag occurs between timing where the intake air amount is finally fixed and timing where the fuel injection amount is fixed. When the variable valve mechanism is operated to change the inlet-valve opening characteristic after the fuel injection amount is fixed, a difference is caused between the actual intake air amount and the intake air amount, which have been decided in accordance with the fuel injection amount, and accordingly the air fuel ratio might deviate from the target air fuel ratio.

SUMMARY OF THE INVENTION

An object of the invention is to prevent deterioration of control accuracy of air fuel ratio caused by the operation of the variable valve mechanism in the engine provided with the variable valve mechanism, which varies the inlet-valve opening characteristic.

In order to achieve this object, the fuel injection from the fuel injection valve is performed by being divided into first injection and second injection subsequent to the first injection, and a second injection amount in the second injection is computed based on a change in an intake air amount caused by an operation of the variable valve mechanism after the first injection amount is computed in the first injection.

The other objects and features of this invention will be understood from the following description with reference to the accompanying drawings.

BRIEF DESCRIPTION OF THE DRAWINGS

FIGS. 7A and 7B show sectional views illustrating a state in which the variable valve lift mechanism is in high valve lift;

DESCRIPTION OF THE PREFERRED EMBODIMENTS

Figure 1:
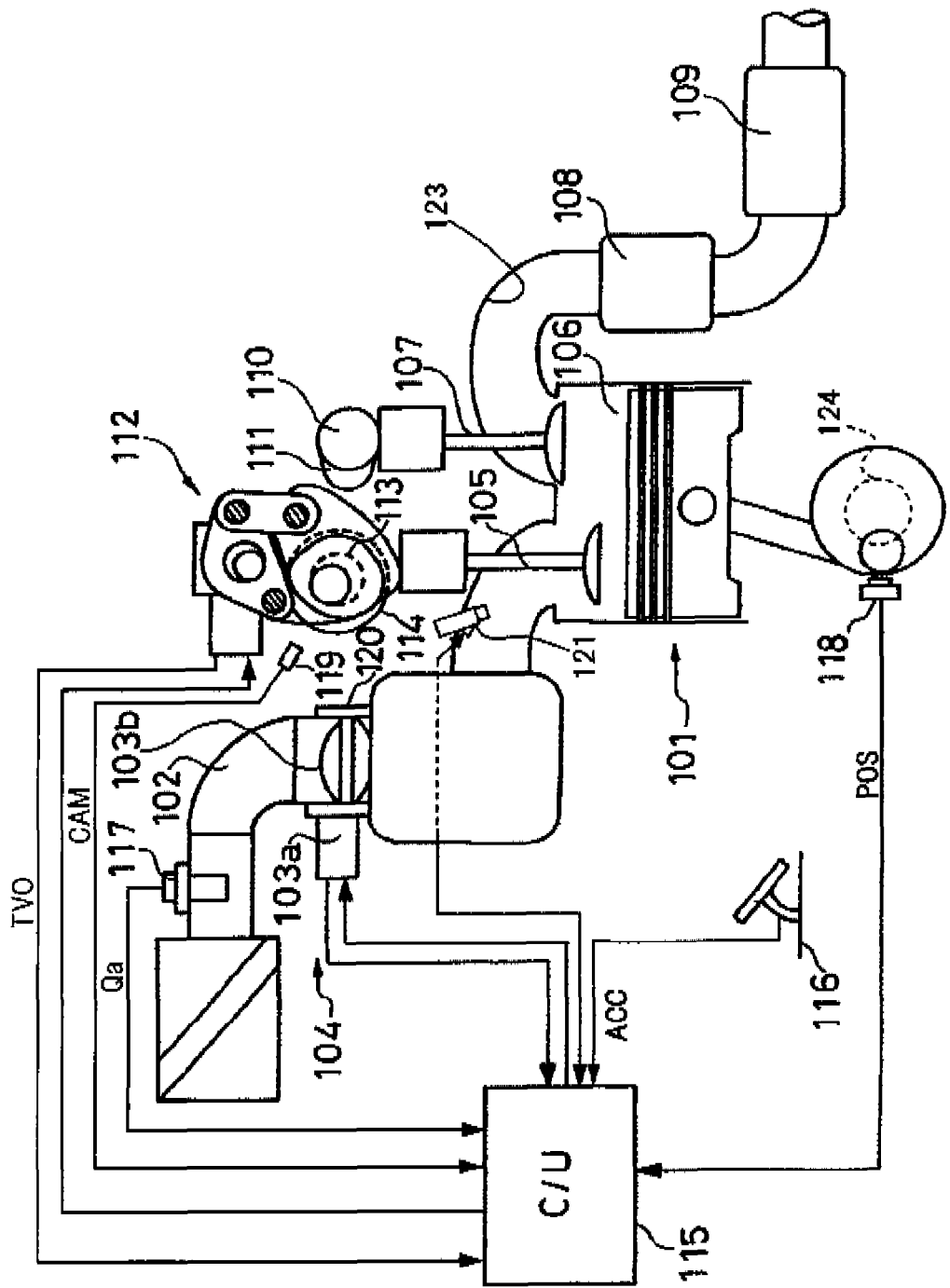
FIG. 1 is a diagram illustrating an engine according to a first embodiment of the present invention.

FIG. 1 illustrates a vehicular engine to which an apparatus for and a method of controlling fuel injection according to a first embodiment of the present invention are applied.

Referring to FIG. 1, in an inlet pipe 102 of an engine 101, an electronic control throttle 104 in which a throttle motor 103a opens and closes a throttle valve 103b is interposed.

In engine 101 including plural cylinders, air is taken in each combustion chamber 106 through electronic control throttle 104 and inlet valves 105.

In a portion of inlet pipe 102 located on an upstream of inlet valve 105 and on a downstream of electronic control throttle 104, a fuel injection valve 121 is provided in each cylinder, and by fuel injected from fuel injection valve 121 into inlet pipe 102, an air fuel mixture is formed in a combustion chamber 106.

Fuel injection valve 121 injects the fuel of an amount proportional to a valve-opening time.

The fuel in combustion chamber 106 is ignited and combusted by spark ignition of a spark plug (not shown in the figure).

An exhaust gas in combustion chamber 106 is discharged to an exhaust pipe 123 through exhaust valves 107.

The exhaust gas lead out from combustion chamber 106 by exhaust pipe 123 is emitted into the atmosphere after passing through a catalytic converter 108 and a muffler 109.

A cam 111 is integrally provided in an exhaust camshaft 110, and exhaust valve 107 is opened and closed by cam 111 while a valve lift amount, a valve working angle, and a valve timing are kept constant.

On the other hand, in inlet valve 105, the valve lift amount and the valve working angle are continuously changed by a variable valve lift mechanism 112 served as the variable valve mechanism.

A variable valve timing mechanism 114 is provided in an end portion of an inlet camshaft 113. Variable valve timing mechanism 114 changes a rotational phase of inlet camshaft 113 relative to a crankshaft 124, and thereby continuously changing a central phase of the valve working angle of inlet valve 105.

A control unit 115 in which a microcomputer is incorporated controls electronic control throttle 104, fuel injection valve 121, variable valve lift mechanism 112, and variable valve timing mechanism 114.

Control unit 115 receives signals output from various sensors.

Examples of the various sensors include an accelerator opening sensor 116 that detects an accelerator opening ACC, an airflow sensor 117 that detects an intake air amount Ca of engine 101, a crank angle sensor 118 that outputs a rotation angle signal POS of crankshaft 124, a cam angle sensor 119 that outputs a rotation angle signal CAM of inlet camshaft 113, and a throttle sensor 120 that detects an opening TVO of throttle valve 103b.

Control unit 115 detects the rotational phase of inlet camshaft 113 relative to crankshaft 124 based on the signals detected by crank angle sensor 118 and cam angle sensor 119.

Control unit 115 sets a target value of the rotational phase according to an operating state of engine 101, and control unit 115 controls variable valve timing mechanism 114 such that the rotational phase of inlet camshaft 113 becomes the target value.

Control unit 115 also controls electronic control throttle 104 and variable valve lift mechanism 112 so as to obtain the intake air amount corresponding to the accelerator opening ACC.

Specifically, while by variable valve lift mechanism 112 the valve lift amount and the valve working angle is controlled to control the intake air amount, the opening of throttle valve 103b is controlled such that a target inlet negative pressure is generated.

Not only the inlet negative pressure is used for a purge process of fuel vapor from a canister (not shown) that collects the fuel vapor generated in a fuel tank and a blow-by gas process, but also the inlet negative pressure is used as a power source in a master vac (not shown) that boosts a brake operation force.

In the operating state in which the inlet negative pressure is not requested, variable valve lift mechanism 112 controls the intake air amount while throttle valve 103b is fully opened.

In a low load region where the control of the target intake air amount cannot be performed only by variable valve lift mechanism 112, the opening of throttle valve 103b is throttled while variable valve lift mechanism 112 is controlled.

Hereinafter, a structure of variable valve lift mechanism 112 will be described.

Figure 2:
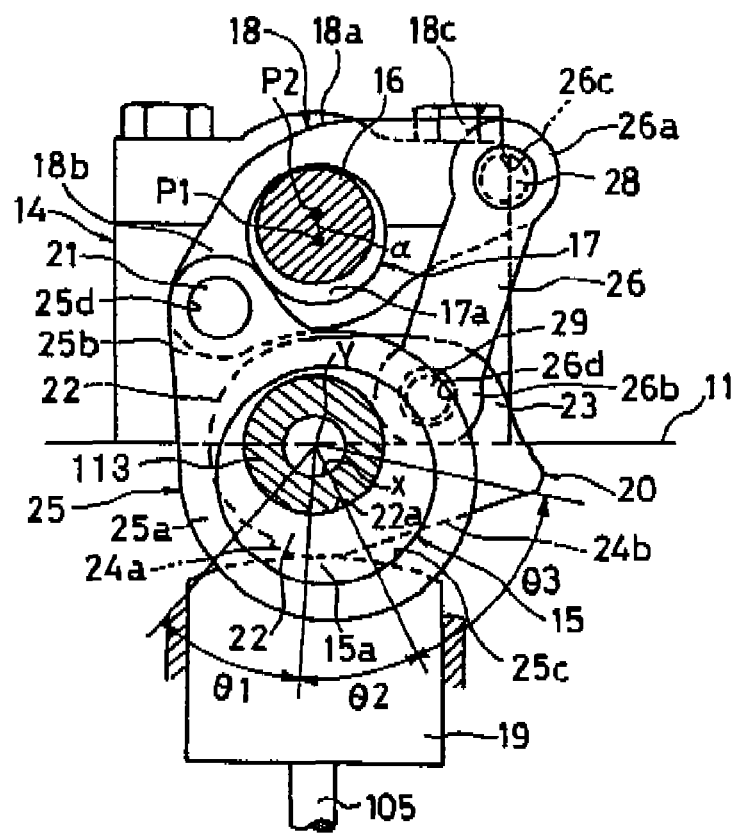
FIG. 2 is a sectional view illustrating a variable valve lift mechanism included in the engine.
Figure 3:
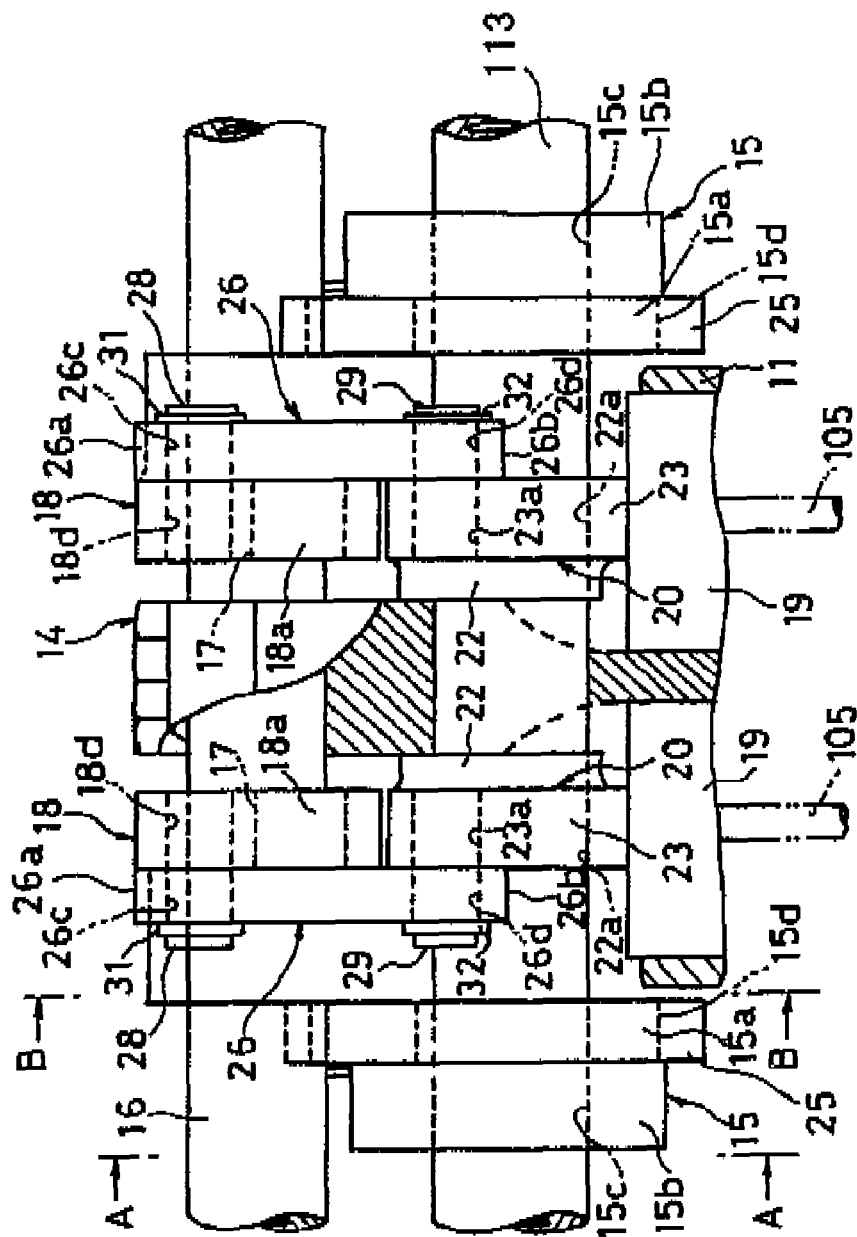
FIG. 3 is a side view of the variable valve lift mechanism.
Figure 4:
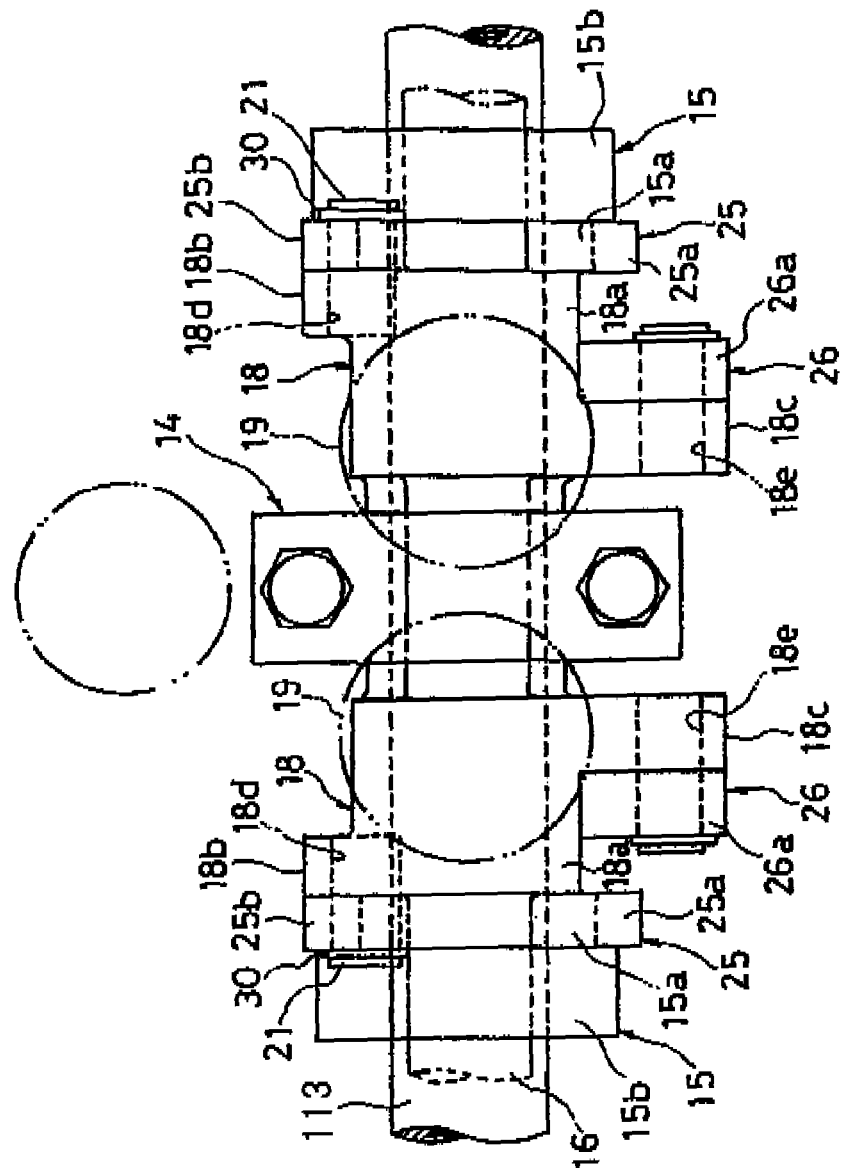
FIG. 4 is a plan view of the variable valve lift mechanism.

Referring to FIGS. 2 to 4, variable valve lift mechanism 112 includes inlet camshaft 113 that is rotatably supported in a camshaft bearing 14 of a cylinder head 11, and a control shaft 16 that is rotatably supported in camshaft bearing 14 while located above inlet camshaft 113, a pair of inlet valves 105 and 105, two eccentric cams 15 and 15 that are of the rotation cam axially supported on inlet camshaft 113, a pair of rocker arms 18 and 18 that is swingably supported by control shaft 16 via a control cam 17, and a pair of oscillating cams 20 and 20 that is independently disposed on top of each of inlet valves 105 and 105 via valve lifters 19 and 19. Inlet camshaft 113 and control shaft 16 are shared by the cylinders. Inlet valves 105 and 105, eccentric cams 15 and 15, rocker arms 18 and 18, and oscillating cams 20 and 20 are provided in each cylinder.

Eccentric cams 15 and 15 and rocker arms 18 and 18 are coupled by link arms 25 and 25, and rocker arms 18 and 18 and oscillating cams 20 and 20 are coupled by link members 26 and 26.

Figure 5:
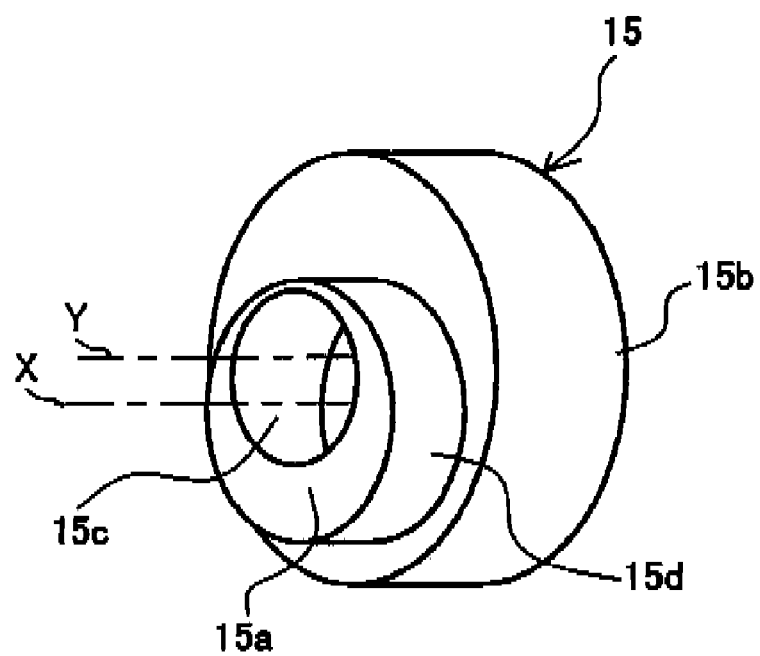
FIG. 5 is a perspective view illustrating an eccentric cam used in the variable valve lift mechanism.
Figure 6A:
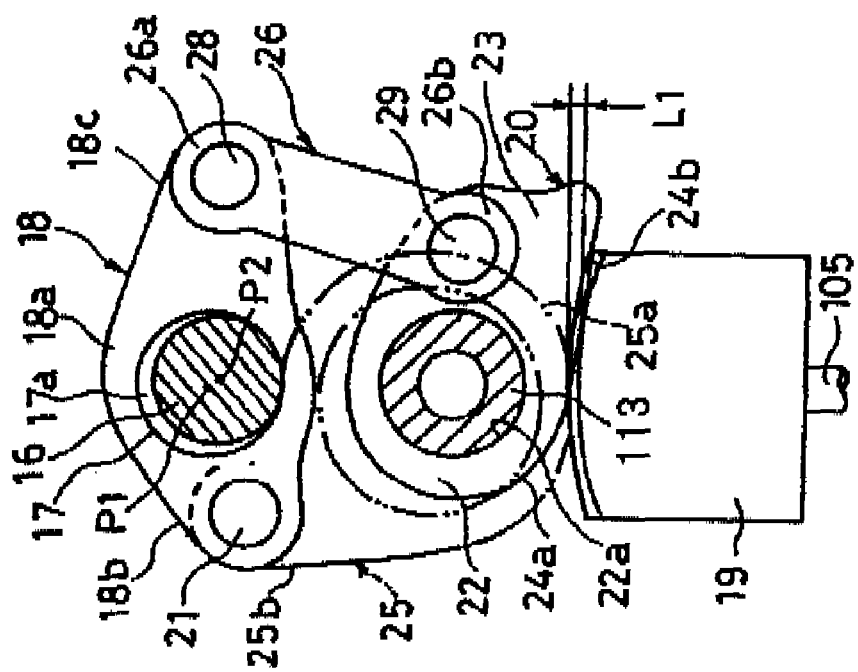
FIGS. 6A and 6B shows sectional views illustrating a state in which the variable valve lift mechanism is in low valve lift.
Figure 6B:
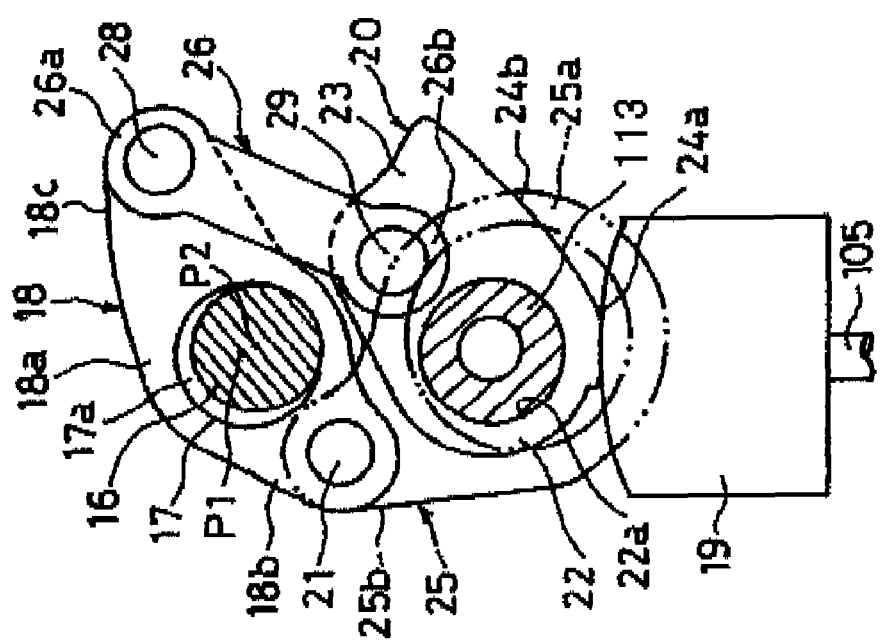

Referring to FIG. 5, eccentric cam 15 having a substantial ring shape includes a cam body 15a having a smaller diameter and a flange portion 15b that is integrally provided in an outer end face of cam body 15a. In eccentric cam 15, a camshaft insertion hole 15c is formed to penetrate therethrough in an internal axial direction of eccentric cam 15, and a central axis X of cam body 15a is decentered by a predetermined amount with respect to a central axis Y of inlet camshaft 113.

Eccentric cams 15 are press-fitted with inlet camshaft 113 through camshaft insertion holes 15c on both outer sides where eccentric cams 15 do not interfere with valve lifters 19, and outer circumferential surfaces of cam bodies 15a is formed to have the same cam profile.

Referring to FIG. 4, a central base portion 18a of rocker arm 18 is rotatably supported by control cam 17.

In one end portion 18b provided so as to protrude on an outer end portion of base portion 18a of rocker arm 18, there is through-formed a pin hole 18d into which a pin 21 linking with a leading end portion of a link arm 25 is press-fitted. On an other end portion 18c provided so as to protrude on the inner end portion of base portion 18a, there is formed a pin hole 18e into which a pin 28 joining with below-mentioned one end portion 26a of each link member 26 is press-fitted.

Control cam 17 having a cylindrical shape is fixed to an outer circumference of control shaft 16, and a central axis P1 of control cam 17 is decentered by a predetermined amount a with respect to a central axis P2 of control shaft 16 as shown in FIG. 2.

Referring to FIGS. 2, 6A, 6B, 7A, and 7B, in oscillating cam 20, a support hole 22a in which inlet camshaft 113 is fitted and rotatably supported is formed to penetrate through a substantially-annular base end portion 22, and a pin hole 23a is formed to penetrate through an end portion 23 located on the side of the other end portion 18c of rocker arm 18.

On an under face of oscillating cam 20, there are formed a base circle surface 24a on the side of base end portion 22 and a cam surface 24b extended in an arc shape from base circle surface 24a toward an edge side of end portion 23. Base circle surface 24a and cam surface 24b abut on a predetermined position in an upper surface of each valve lifter 19 according to an oscillation position of oscillating cam 20.

Figure 8:
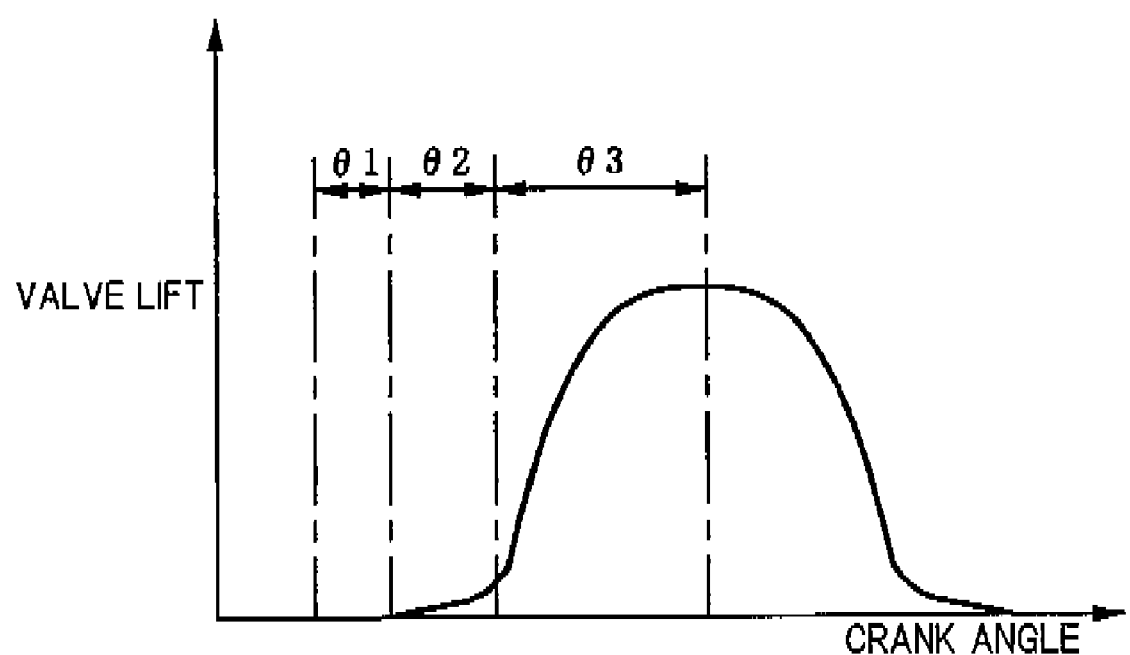
FIG. 8 is a diagram illustrating a valve lift characteristic in the variable valve lift mechanism.

That is, from the viewpoint of valve lift characteristic of FIG. 8, it is set such that, as shown in FIG. 2, a predetermined angle range θ1 of base circle surface 24a becomes a base circle interval, a predetermined angle range θ2 from the base circle interval θ1 of cam surface 24b becomes a so-called ramp interval, and a predetermined angle range θ3 from the ramp interval θ2 of cam surface 24b becomes a lift interval.

Link arm 25 is provided with an annular base portion 25a and a projected end 25b that is projected at a predetermined position of an outer circumferential surface of base portion 25a. In a central position of base portion 25a, there is formed a fitting hole 25c in which the outer circumferential surface of cam body 15a of eccentric cam 15 is rotatably fitted. In projected end 25b, there is through-formed a pin hole 25d in which pin 21 is rotatably inserted.

Link member 26 is linearly formed with a predetermined length. In circular end portions 26a and 26b, there is through-formed Pin through-holes 26c and 26d in which end portions of pins 28 and 29 press-fitted in pin holes 18d and 23a of the other end portion 18c of rocker arm 18 and end portion 23 of oscillating cam 20 are rotatably inserted.

In end portions of pins 21, 28 and 29, snap rings 30, 31 and 32 are provided in order to regulate axial direction movement of link arm 25 or link member 26.

Figure 10:
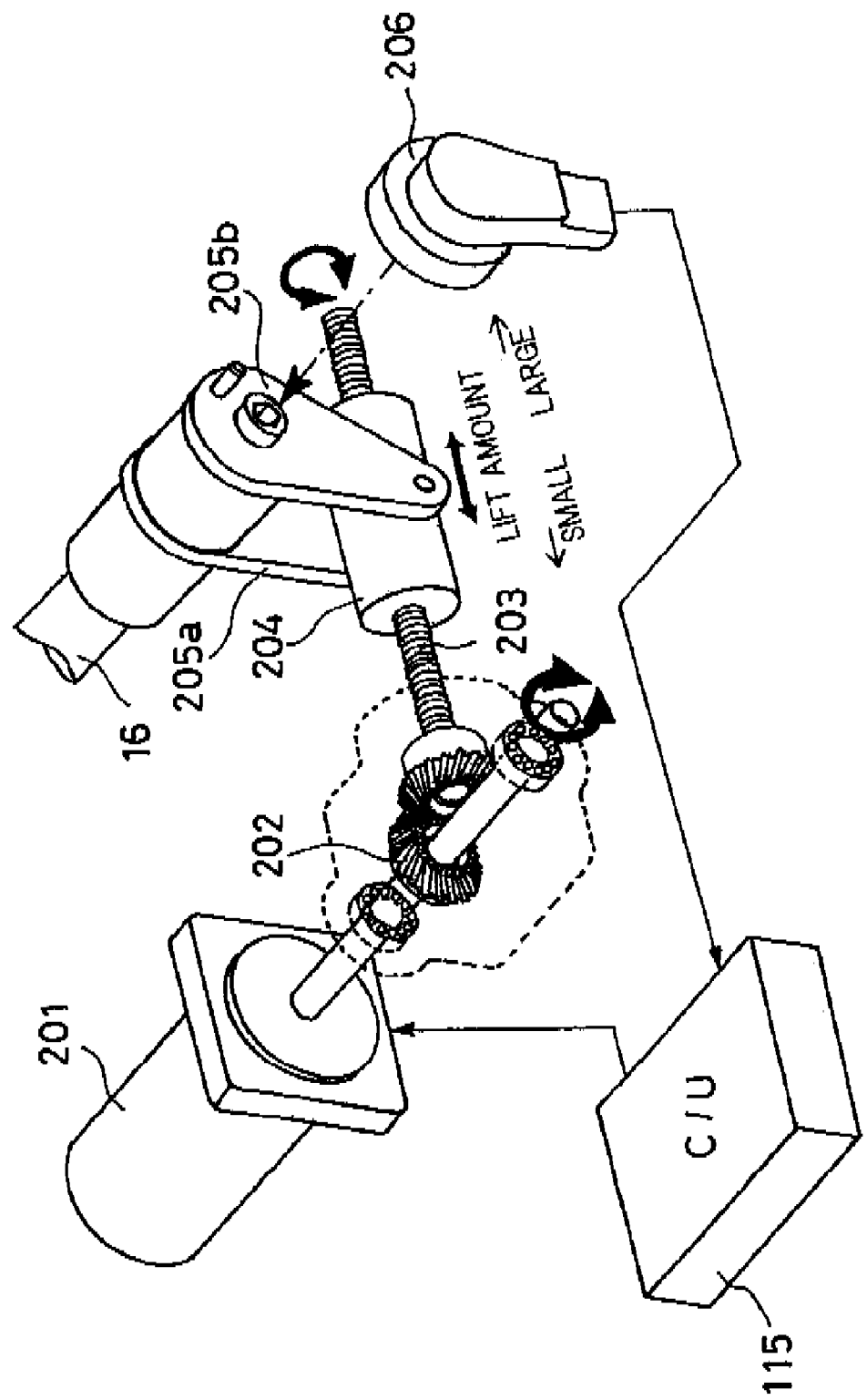
FIG. 10 is a perspective view illustrating a control shaft driving mechanism in the variable valve lift mechanism.

Referring to FIG. 10, control shaft 16 is driven to be rotated within a predetermined rotational angle range by an actuator 201 such as a DC motor provided in one end portion.

Figure 9:
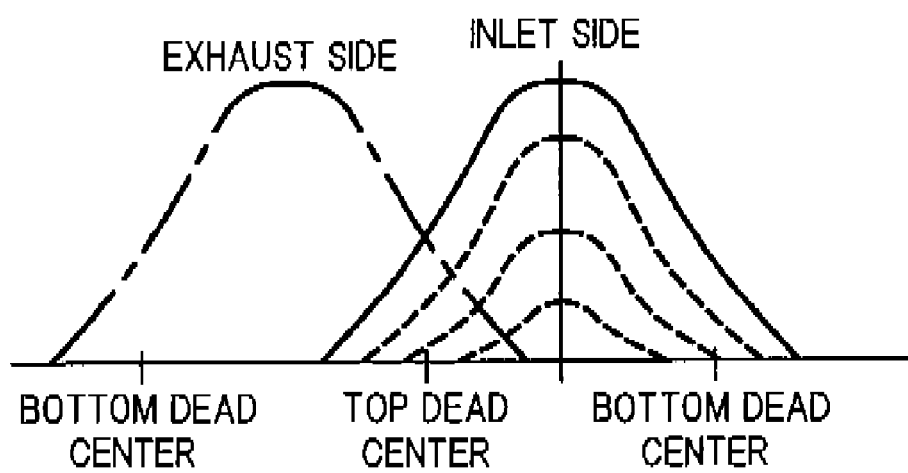
FIG. 9 is a diagram Illustrating a change in valve timing of the inlet valve and a change in valve lift amount in the variable valve lift mechanism.

As shown in FIG. 9, by changing an angle of control shaft 16, the valve lift amount and the valve working angle of inlet valves 105 and 105 are continuously changed.

In FIG. 10, the rotation of actuator 201 is transmitted to a shaft 203 via a transmission member 202, thereby changing a position in an axial direction of a nut 204 in which shaft 203 is inserted.

Then control shaft 16 is rotated by a pair of stay members 205a and 205b. The stay members 205a and 205b are attached to a leading end of control shaft 16, and an end of each of stay members 205a and 205b is fixed to nut 204.

As showing in FIG. 10, the valve lift amount is decreased by bringing the position of nut 204 close to transmission member 202, while the valve lift amount is increased by moving the position of nut 204 away from transmission member 202.

A angle sensor 206 is provided at the leading end of control shaft 16 in order to detect the angle of control shaft 16, and control unit 115 performs feedback control to a manipulated variable of actuator 201 such that the actual angle of control shaft 16, detected by angle sensor 206, is brought close to a target angle.

Figure 11:
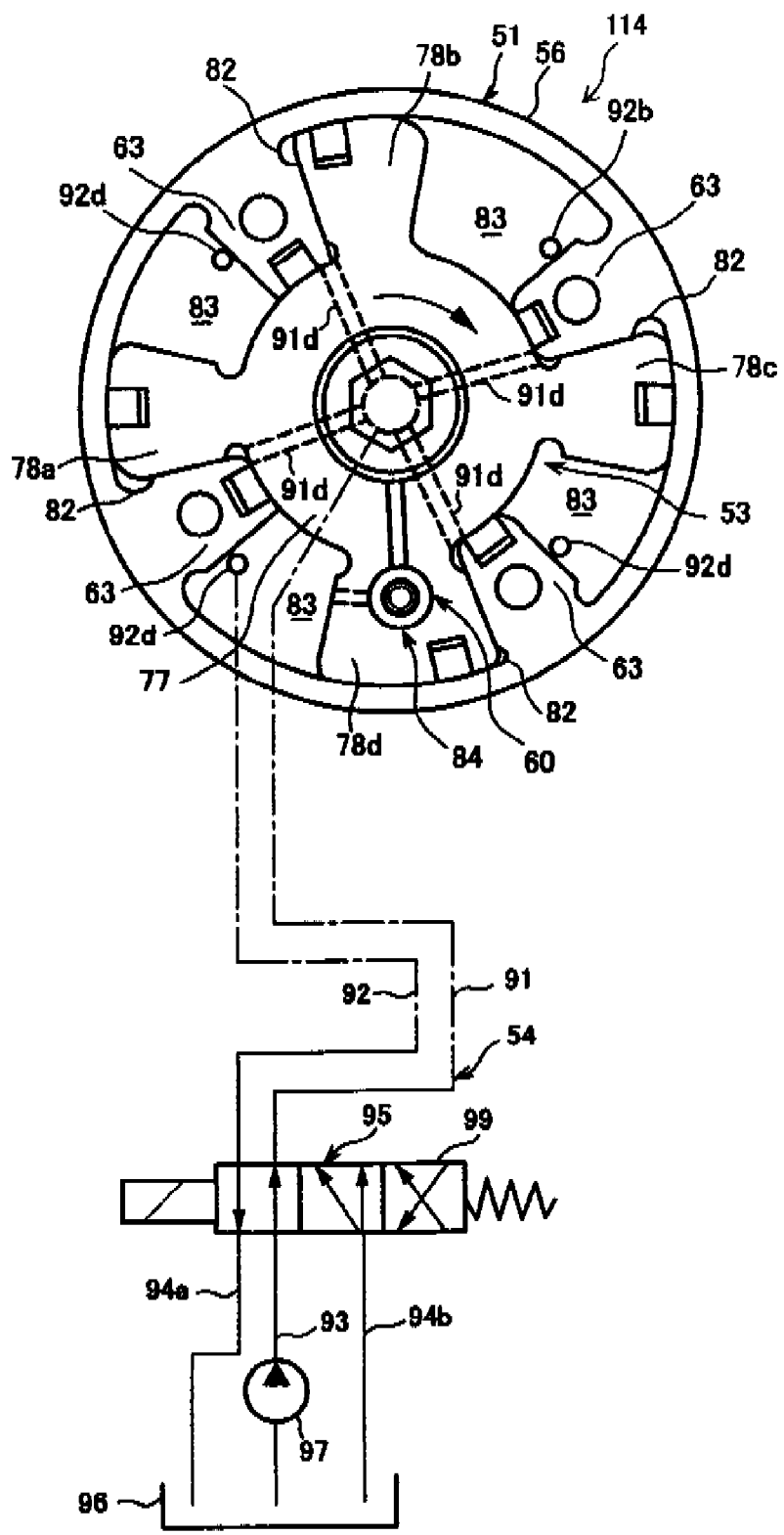
FIG. 11 is a sectional view illustrating a variable valve timing mechanism 114 included in the engine.

FIG. 11 illustrates a structure of variable valve timing mechanism 114.

Variable valve timing mechanism 114 according to a first embodiment is a hydraulic vane mechanism provided with a cam sprocket 51, a rotating member 53, a hydraulic circuit 54, and a lock mechanism 60. Cam sprocket 51 is driven to be rotated by crankshaft 124 via a timing chain. Rotating member 53 is fixed to an end portion of inlet camshaft 113, and rotating member 53 is rotatably accommodated in cam sprocket 51. Hydraulic circuit 54 rotates rotating member 53 relative to cam sprocket 51. Lock mechanism 60 selectively locks the relative rotation between cam sprocket 61 and rotating member 53 at a predetermined position.

Cam sprocket 51 is provided with a rotating unit, a housing 56, and a front cover and a rear cover. The rotating unit has a teeth portion in the outer circumference thereof, and the teeth portion engages a timing chain or a timing belt. Housing 56 is disposed in front of the rotating unit, and rotatably accommodates rotating member 53 therein. The front cover and the rear cover close front and rear apertures of housing 56.

Housing 56 has a cylindrical shape in which front and rear ends are opened, and four partition portions 63 are projected from an inner circumferential surface of housing 56. A cross-sectional surface of each of partition portions 63 has a trapezoidal shape, and partition portions 63 are provided at intervals of 90° along a circumferential direction of housing 56.

Rotating member 53 is fixed to a front end portion of inlet camshaft 113, and four vanes 78a, 78b, 78c, and 78d are provided at intervals of 90° in an outer circumferential surface of an annular base portion 77.

Each of first to fourth vanes 78a to 78d has a substantially-inverted trapezoidal shape in section, and each of first to fourth vanes 78a to 78d is disposed in a recess between partition portions 63 to divide the recess into front and rear portions in the rotational direction. An advance angle-side hydraulic chamber 82 and a retard angle-side hydraulic chamber 83 are formed between both sides of vanes 78a to 78d and both side faces of each of partition portions 63.

In lock mechanism 60, a lock pin 84 is arranged to be inserted in an engagement hole at a turning position on a maximum retard angle side of rotating member 53.

Hydraulic circuit 54 includes two systems of oil pressure passages, that is, a first oil pressure passage 91 and a second oil pressure passage 92. First oil pressure passage 91 supplies and discharges an oil pressure to advance angle-side hydraulic chamber 82, and second oil pressure passage 92 supplies and discharges the oil pressure to retard angle-side hydraulic chamber 83. A supply passage 93 and drain passages 94a and 94b are connected to oil pressure passages 91 and 92 through an electromagnetic selector valve 95 for switching the passages, respectively.

An engine-driven oil pump 97 is provided in supply passage 93 in order to pump the oil in oil pan 96, and downstream ends of drain passages 94a and 94b are communicated with an oil pan 96.

First oil pressure passage 91 is connected to four branched passages 91d. Branched passages 91d are radially formed in base portion 77 of rotating member 53 and communicated with respective advance angle-side hydraulic chambers 82. Second oil pressure passage 92 is connected to four oil holes 92*d* that are made in respective retard angle-side hydraulic chambers 83.

Electromagnetic selector valve 95 controls such that a spool valve body relatively switches among oil pressure passages 91, 92, and supply passage 93 and drain passages 94*a*, 94*b*.

Control unit 115 controls an amount of current supplied to an electromagnetic actuator 99 based on a duty control signal, which is used to control an on-time ratio. Electromagnetic actuator 99 drives electromagnetic selector valve 95.

For example, when a control signal having a duty ratio of 0%, that is, an off-signal is output to electromagnetic actuator 99, operating oil pumped from oil pump 47 is supplied to retard angle-side hydraulic chamber 83 through second oil pressure passage 92, and the operating oil in advance angle-side hydraulic chamber 82 is discharged from first drain passage 94*a* into oil pan 96 through first oil pressure passage 91.

Accordingly, an internal pressure of retard angle-side hydraulic chamber 83 becomes high, an internal pressure of advance angle-side hydraulic chamber 82 becomes low, and rotating member 53 is rotated onto the maximum retard angle side through vanes 78*a* to 78*b*, whereby a retard angle is generated in the central phase of the working angle of inlet valve 105.

On the other hand, when the control signal having the duty ratio of 100%, that is, an on-signal is output to electromagnetic actuator 99, the operating oil is supplied to advance angle-side hydraulic chamber 82 through first oil pressure passage 91, and the operating oil in retard angle-side hydraulic chamber 83 is discharged to oil pan 96 through second oil pressure passage 92 and second drain passage 94*b*, whereby retard angle-side hydraulic chamber 83 becomes a low pressure.

Therefore, rotating member 53 is rotated onto the maximum advance angle side through vanes 78*a* to 78*d*, whereby an advance angle is generated in the central phase of the working angle of inlet valve 105.

Variable valve timing mechanism 114 is not limited to hydraulic vane mechanism of FIG. 11.

For example, a variable valve timing mechanism disclosed in Japanese Laid-Open (Kokai) Patent Application Publication No. 2003-184516 including a movable guide unit that is displaceably guided and engaged with a spiral guide, a motor type variable valve timing mechanism disclosed in Japanese Laid-Open (Kokai) Patent Application Publication No. 2008-025541 in which a camshaft is driven by a motor, and an electromagnetic brake type variable valve timing mechanism disclosed in Japanese Laid-Open (Kokai) Patent Application Publication No. 2007-120339 in which a helical spline and an electromagnetic brake are combined can be adopted as variable valve timing mechanism 114.

Hereinafter, the intake air amount control performed by control unit 115 will be described below.

Figure 12:
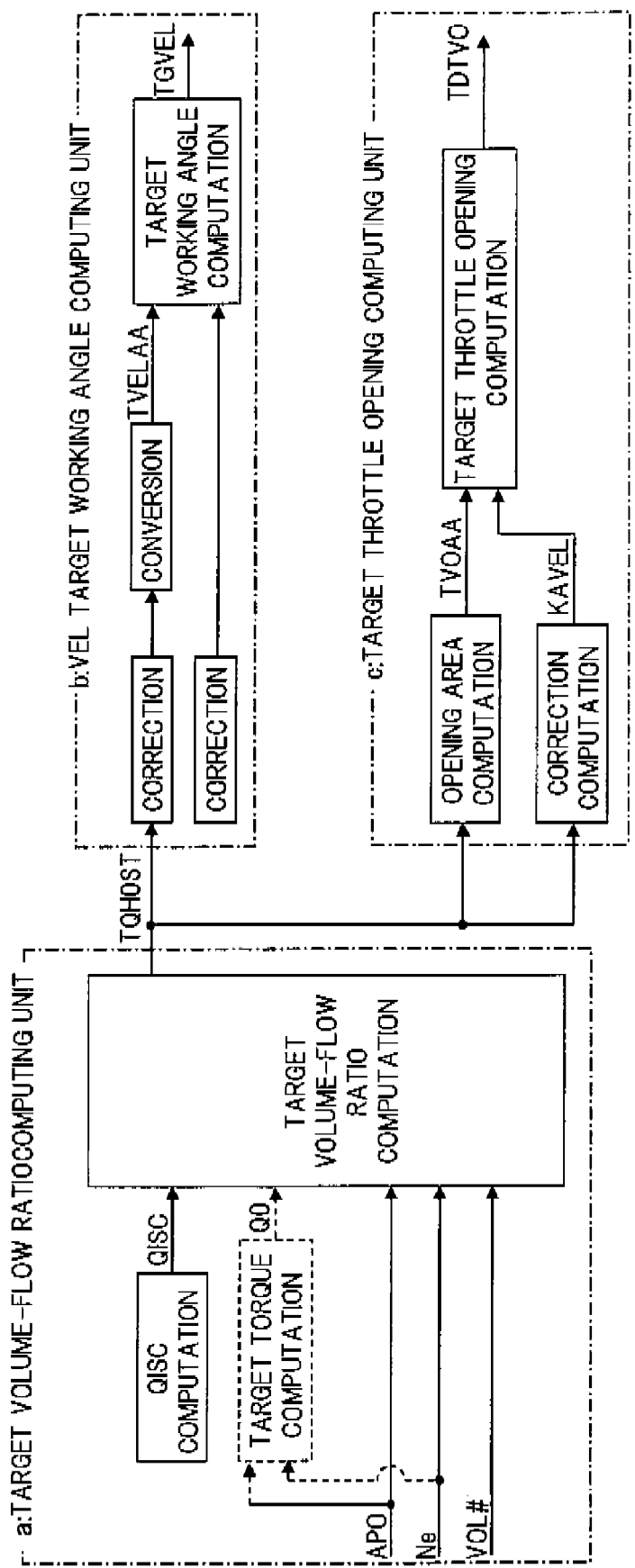
FIG. 12 is a block diagram illustrating intake air amount control in the first embodiment.

FIG. 12 is a block diagram illustrating an intake air amount controlling function performed by control unit 115.

Referring to FIG. 12, control unit 115 has functions as a target volume-flow ratio computing unit a, a target working angle computing unit b, and a target throttle opening computing unit c.

In the configuration of FIG. 12, the control of the intake air amount is disclosed in Japanese Laid-Open (Kokai) Patent Application Publication No. 2003-184587.

Computing processing in target volume-flow ratio computing unit a will be described.

A target volume-flow ratio TQH0ST corresponding to a target torque is computed in target volume-flow ratio computing unit a.

Specifically, while a required air amount Q0 corresponding to the accelerator opening ACC and an engine rotational speed NE at that time is computed, an idle air amount QISC that is required to bring the idle engine rotational speed NE close to the target idle engine rotational speed NE is computed.

Control unit 115 computes the engine rotational speed NE based on the signal output from crank angle sensor 118.

The idle air amount QISC is added to the required air amount Q0 to compute a total required air amount Q, and the total required air amount Q is divided by the engine rotational speed NE and a cylinder volume VOL# to compute the target volume-flow ratio TQH0ST:

$$Q = Q0 + QISC$$

$$TQH0ST = Q/(NE \cdot VOL\#)$$

Hereinafter, computing processing in target working angle computing unit b will be described.

In target working angle computing unit b, a target valve opening area TVELAA is computed based on the target volume-flow ratio TQH0ST, and a target working angle TGVEL is set based on the target valve opening area TVELAA.

Figure 13:
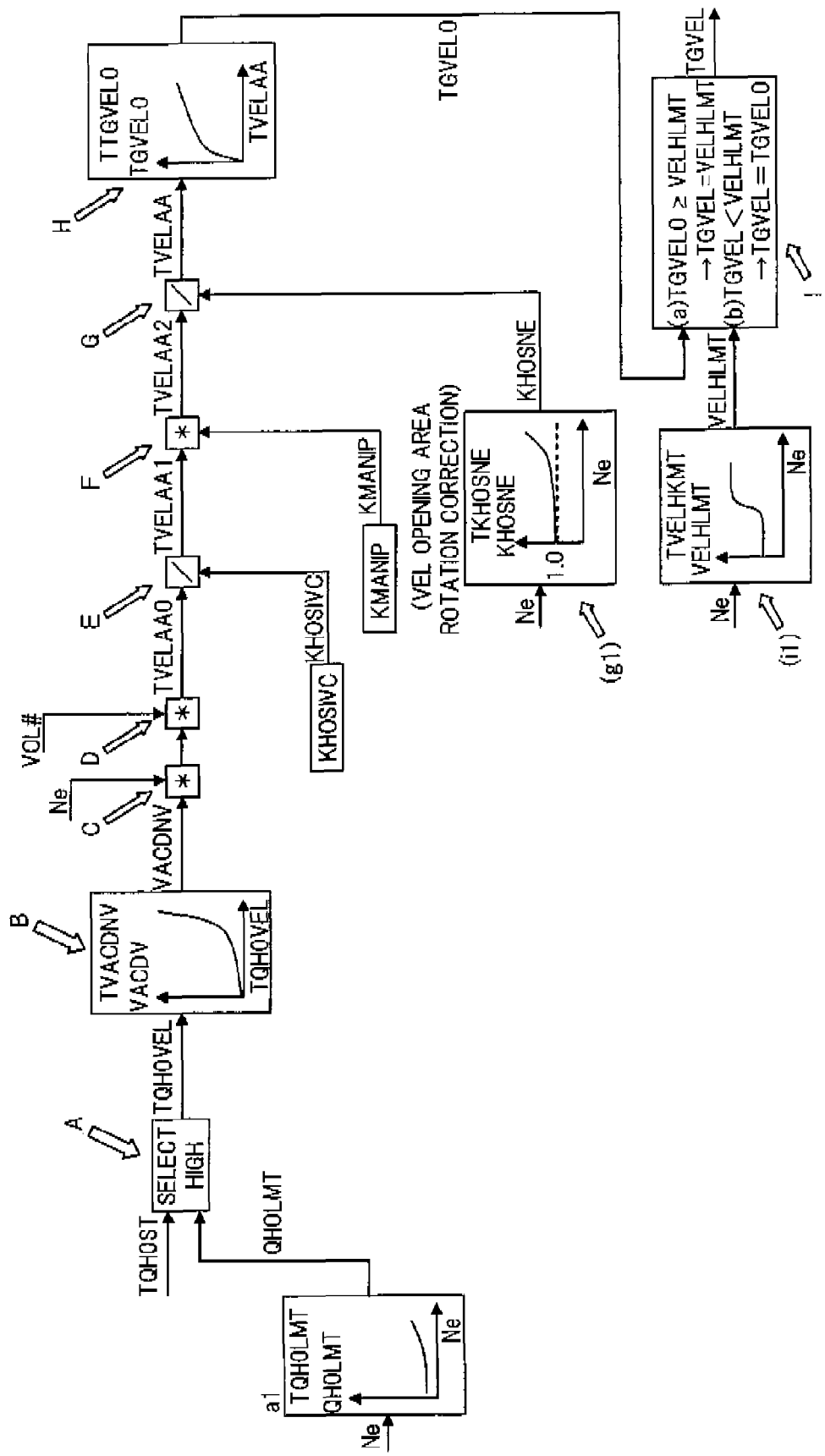
FIG. 13 is a block diagram illustrating processing for computing a target working angle of the variable valve lift mechanism in the first embodiment.

FIG. 13 illustrates a detailed computing function of target working angle computing unit b.

Referring to FIG. 13, in a section A, the target volume-flow ratio TQH0ST and a minimum volume-flow ratio QH0LMT are compared to select larger one, and a volume-flow ratio TQH0VEL that is required to be obtained by variable valve lift mechanism 112 is set.

The minimum volume-flow ratio QH0LMT is a minimum volume-flow ratio that is able to be obtained by variable valve lift mechanism 112, that is, a volume-flow ratio in the minimum valve lift amount. In a sectional a table TQH0LMT shown in FIG. 13 is searched based on the engine rotational speed NE, such that the minimum volume-flow ratio QH0LMT is computed to a larger value as the engine rotational speed NE increases.

In a section B, the volume-flow ratio TQH0VEL is converted into a state quantity VACDNV corresponding to a valve opening area AV based on a table TVACDNV shown in FIG. 13.

The state quantity VACDNV satisfies the following equation:

$$VACDNV = AV \cdot Cd/N/V$$

where AV is the valve opening area, Cd is a loss coefficient, N is a rotational speed, and V is a cylinder volume.

The state quantity VACDNV obtained by the section B is multiplied by the engine rotational speed NE in a section C, and then multiplied by the cylinder volume VOL# in a section D, to compute a required valve opening area TVELAA0.

That is, the required valve opening area TVELAA0 is computed by the following equation:

$$TVELAA0 = AV \cdot Cd$$

In a section E. the required valve opening area TVELAA0 is divided by a correction value KHOSIVC corresponding to a valve-closing timing IVC of inlet valve 105, to compute the required valve opening area TVELAA1.

When the valve-closing timing IVC of inlet valve 105 is advanced, an effective cylinder volume is decreased and the volume-flow ratio is decreased even in the same valve opening area. Therefore, the required valve opening area TVE-LAA0 is corrected according to the decreased volume-flow ratio.

In a section F, the required valve opening area TVELAA1 computed in the section E is multiplied by a correction value KMANIP, to obtain a required valve opening area TVE-LAA2. The correction value KMANIP is set according to an inlet pipe pressure on the upstream side of inlet valve 105.

In a section G, the required valve opening area TVELAA2 computed in the section F is divided by a correction value KHOSNE, to obtain required valve opening area TVELAA. The correction value KHOSNE is set according to the engine rotational speed NE.

The correction value KHOSNE is computed in a section g1 by searching a table TKHOSNE shown in FIG. 13 based on the engine rotational speed NE, and the correction value KHOSNE is set to a value larger than 1 as the engine rotational speed NE is increased.

In a section H, the required valve opening area TVELAA is converted into a target angle TGVEL0 of control shaft 16 using a table TTGVEL0 shown in FIG. 13.

In a section I, the target angle TGVEL0 obtained by the section H and a maximum angle VELHLMT are compared. When the target angle TGVEL0 is equal to or larger than the maximum angle VELHLMT, the maximum angle VELHLMT is set as the target angle TGVEL. When the target angle TGVEL0 is smaller than the maximum angle VELHLMT, the target angle TGVEL0 is set as the final target angle TGVEL.

The maximum angle VELHLMT is computed in a section i1 by searching a table TVELHLMT shown in FIG. 13 based on the engine rotational speed NE.

Control unit 115 performs feedback control to the manipulated variable of actuator 201 such that an actual angle VELCOM, that is, the actual angle of control shaft 16 becomes the target angle TGVEL.

The setting of the correction value KHOSIVC used in the section E of FIG. 13 will be described with reference to FIG. 14.

Figure 14:
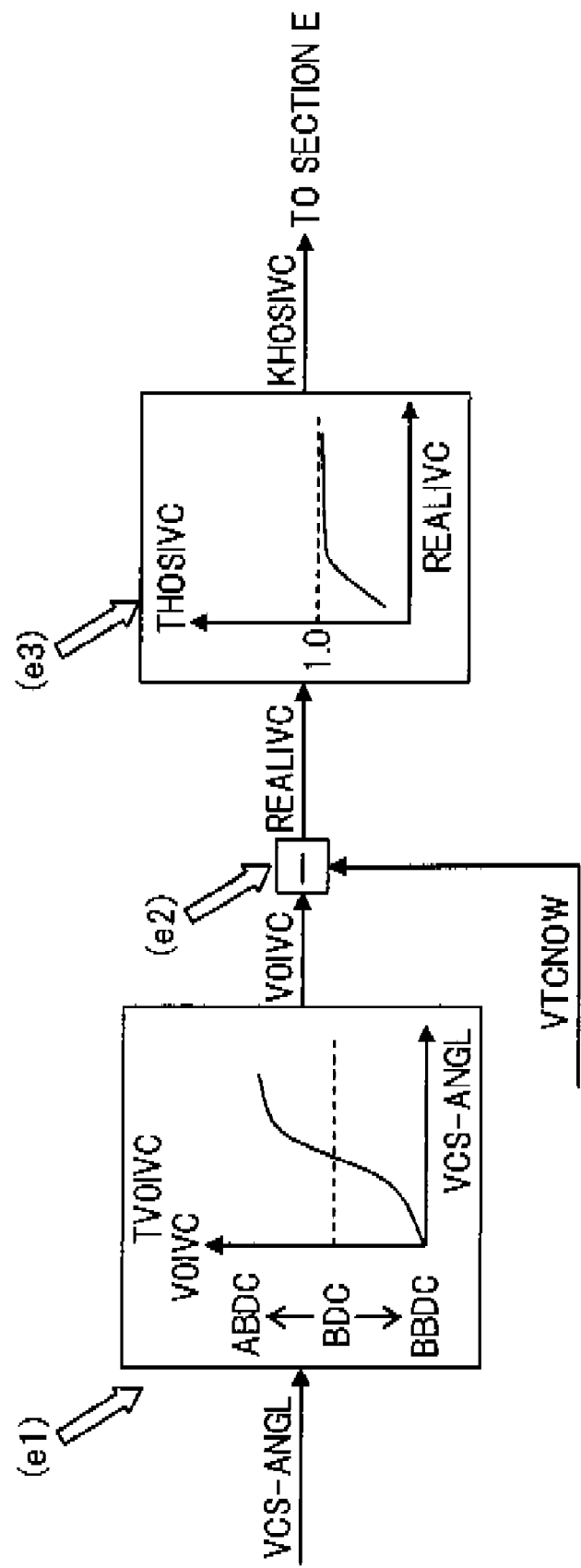
FIG. 14 is a block diagram illustrating processing for setting a correction value KHOSIVC In the first embodiment.

Referring to FIG. 14, in a section e1, when the central phase of the working angle of inlet valve 105 is in the most retard angle state, an angle V0IVC of the valve-closing timing IVC of inlet valve 105 is obtained by referring to a table TV0IVC shown in FIG. 14 based on a valve working angle VSCANGL of inlet valve 105.

Then, in a section e2, an advance angle value VTCNOW of the central phase of variable valve timing mechanism 114 at that time is subtracted from the angle V0IVC of the valve-closing timing IVC to obtain an actual angle REALIVC of the valve-closing timing IVC.

In a section e3, by searching a table TKHOSIVC shown in FIG. 14 based on the angle REALIVC, a correction value KHOSIVC is set and output to the section E of FIG. 13.

Next, the setting of the correction value KMANIP used in the section F of FIG. 13 will be described with reference to FIG. 15.

Figure 15:
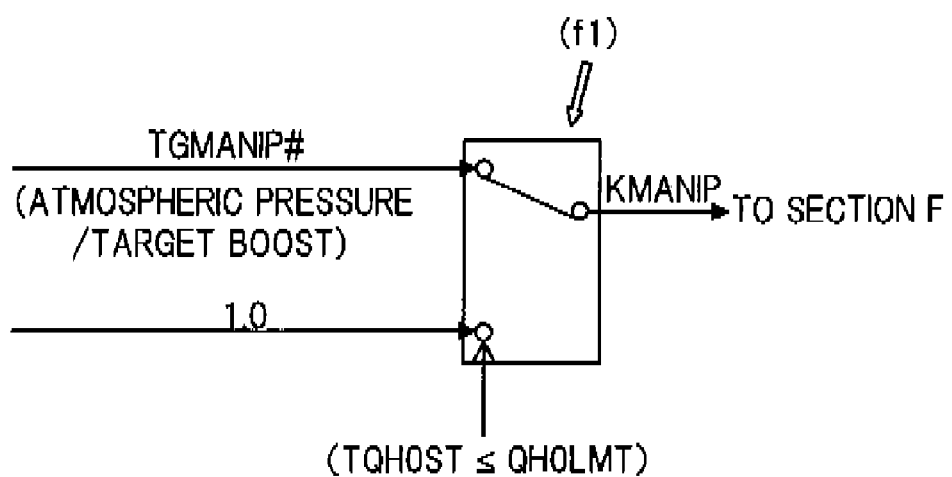
FIG. 15 is a block diagram illustrating processing for setting a correction value KMANIP in the first embodiment.

In a section f1 of FIG. 15, the correction value KMANIP is atmospheric pressure/target boost or 1.0. When the target volume flow TQH0ST is equal to or smaller than the minimum volume-flow ratio QH0LMT, the section f1 outputs 1.0 as the correction value KMANIP. In other cases, the section f1 outputs atmospheric pressure/target boost as the correction value KMANIP.

Then computing processing in target throttle opening computing unit c will be described with reference to FIG. 16.

Figure 16:
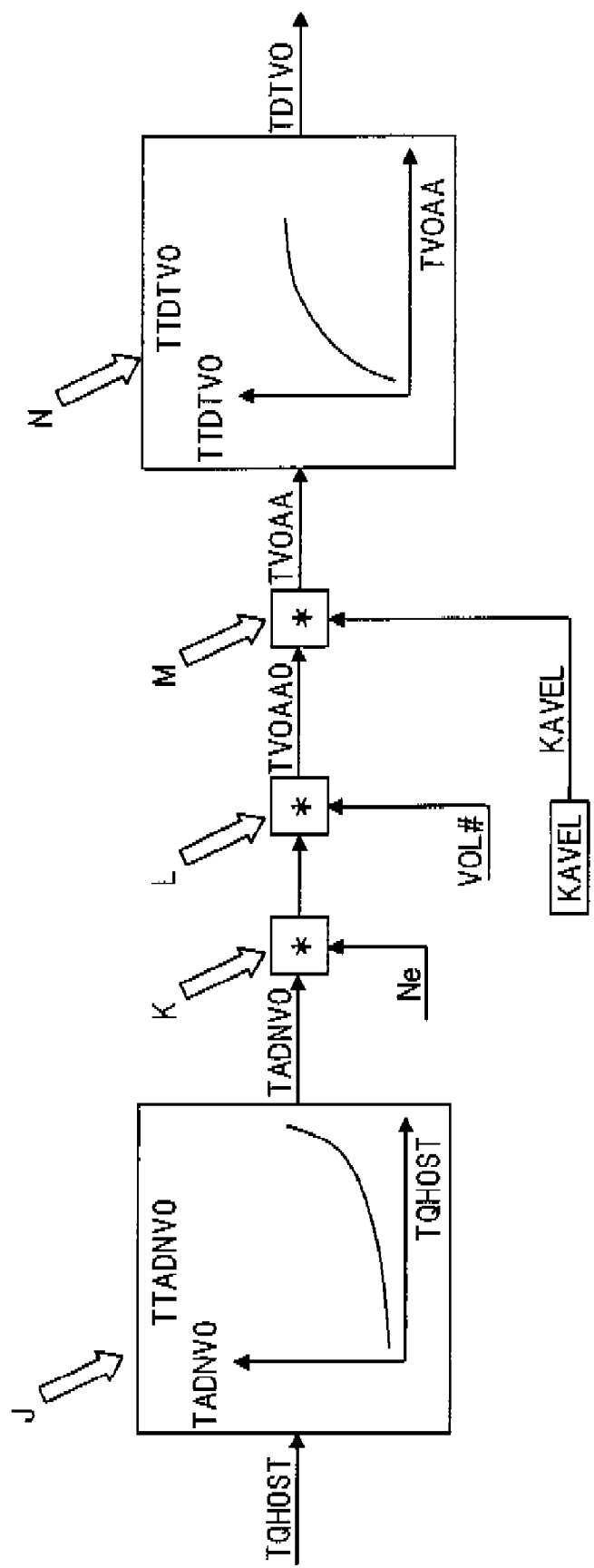
FIG. 16 is a block diagram illustrating processing for computing a target throttle opening in the first embodiment.

Referring to FIG. 16, a state quantity TADNV0 is computed in a section J. The state quantity TADNV0 corresponds to a throttle valve opening area At that is required when an opening characteristic of inlet valve 105 is a reference characteristic.

The reference characteristic means an opening characteristic of inlet valve 105 when the intake air amount of engine 101 is controlled by the throttle valve opening while the valve lift amount, valve working angle, and valve timing of inlet valve 105 are fixed.

In the section J, the state quantity TADNV0 is computed by searching a conversion table TTADNV0 shown in FIG. 16 based on the target volume-flow ratio TOH0ST.

The state quantity TADNV0 is expressed by the following equation:

$$TADNV0 = At/(NE \cdot VOL\#)$$

where At is the throttle valve opening area, NE is the engine rotational speed, and VOL# is the cylinder volume.

The state quantity TADNV0 is multiplied by the engine rotational speed NE in a section K, and then multiplied by the cylinder volume VOL# in a section L, and a throttle required opening area TVOAA0 is computed when the opening characteristic of inlet valve 105 is the reference characteristic.

In a section M, the computed throttle required opening area TVOAA0 is corrected according to the opening characteristic of inlet valve 105 at that time.

Specifically the throttle required opening area TVOAA0 is multiplied by a correction value KAVEL that is set according to the opening characteristic of inlet valve 105 at that time, and a target throttle opening area TVOAA is computed.

In a section N, a target throttle opening TDTVO is set by searching a conversion table TTDTVO shown in FIG. 16 based on the computed target throttle opening area TAVOAA.

Control unit 115 performs the feedback control to the manipulated variable of electronic control throttle 104 such that the opening TVO of throttle valve 103*b* is brought close to the target throttle opening TDTVO.

Hereinafter, the setting of the correction value KAVEL used in the section M of FIG. 16 will be described with reference to FIG. 17.

Figure 17:
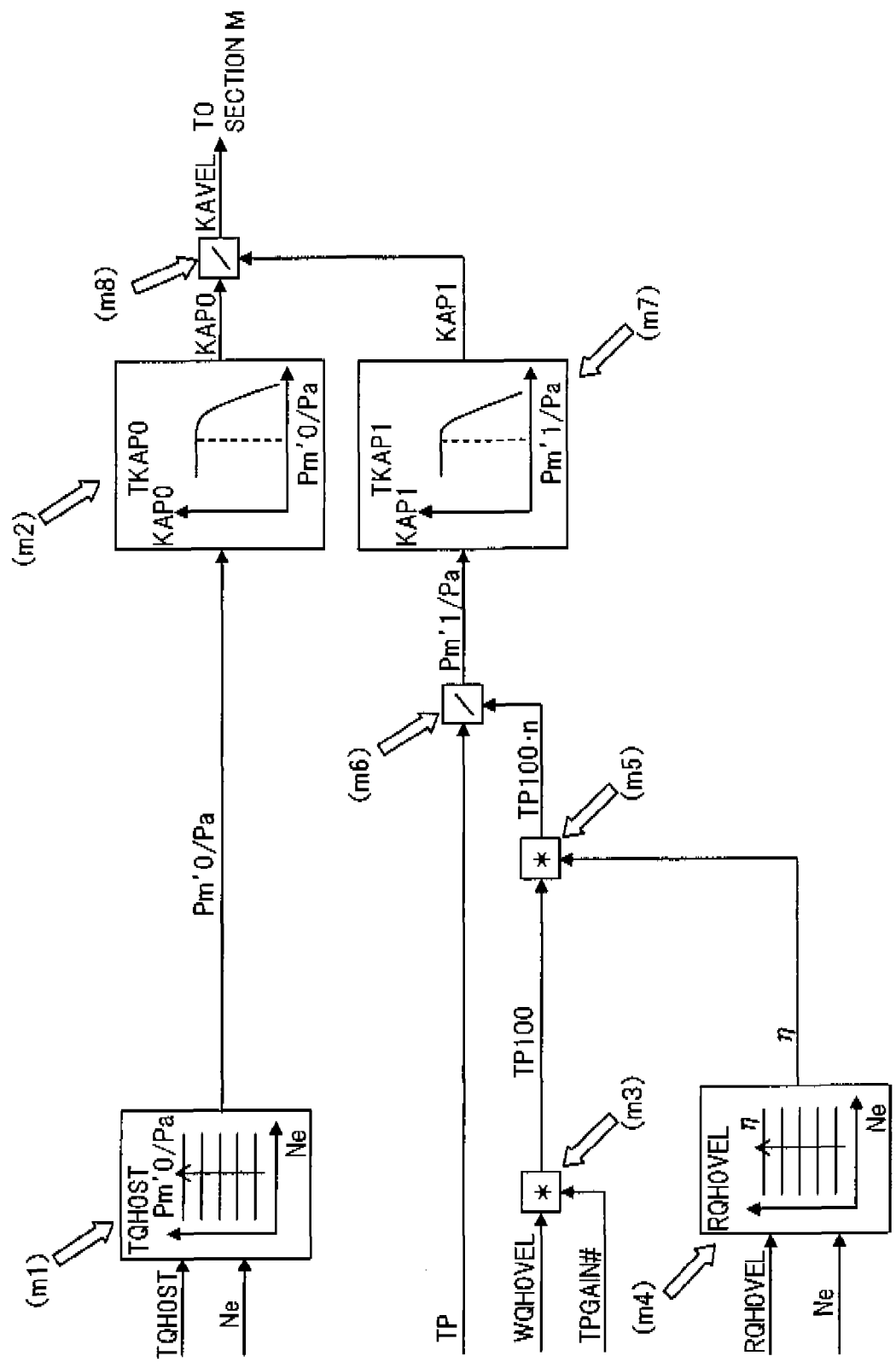
FIG. 17 is a block diagram illustrating processing for setting a correction value KAVEL in the first embodiment.

In a section m1 of FIG. 17, a pressure ratio [Pm'0/Pa] is obtained by referring to a map shown in FIG. 17 based on the target volume-flow ratio TQH0ST and engine rotational speed NE.

"Pa" represents an atmospheric pressure, and "Pm'0" is an intake pressure of when the opening characteristic of inlet valve 105 is the reference characteristic.

In a section m2, a coefficient KPA0 is computed by searching a table TBLKPA0 shown in FIG. 17 based on the pressure ratio [Pm'0/Pa].

On the other hand, in a section m3, a volume-flow ratio WQH0VEL in fully opened throttle valve 103*b* is multiplied by a conversion constant TPGAIN# in order to compute an air amount TP100 that is taken in the cylinder in fully opening throttle valve 103*b*.

In a section m4, a fresh air ratio η is computed by referring to a map shown in FIG. 17 based on an inlet-valve passing volume-flow ratio RQH0VEL and the engine rotational speed NE in choked throttle valve 103*b*.

In a section m5, air amount TP100 that is taken in the cylinder in fully opened throttle valve 103*b* is multiplied by the fresh air ratio η. In a section m6, a basic fuel injection amount TP (ms) described later is divided by [TP100·η].

Because fuel injection valve 121 injects the fuel amount proportional to the valve-opening time, it is assumed that fuel injection amount is indicated by the valve-opening time (ms) of fuel injection valve 121, in the first embodiment.

[TP/(TP100·η)] output from the section m6 indicates a pressure ratio [Pm'1/Pa] of when variable valve lift mechanism 112 is in operation.

In a section m7, a coefficient KAP1 is computed by searching a table TKPA1 shown in FIG. 17 based on the pressure ratio [Pm'1/Pa] of when variable valve lift mechanism 112 is in operation.

In a section m8, the coefficient KAP0 computed by the section m2 is divided by the coefficient KAP1 computed by the section m7, whereby a correction value KAVEL is set and output to the section M of FIG. 16.

Next, the computations of the volume-flow ratio WQH0VEL and actual volume-flow ratio RQH0VEL will be described with reference to the block diagram of FIG. 18.

Figure 18:
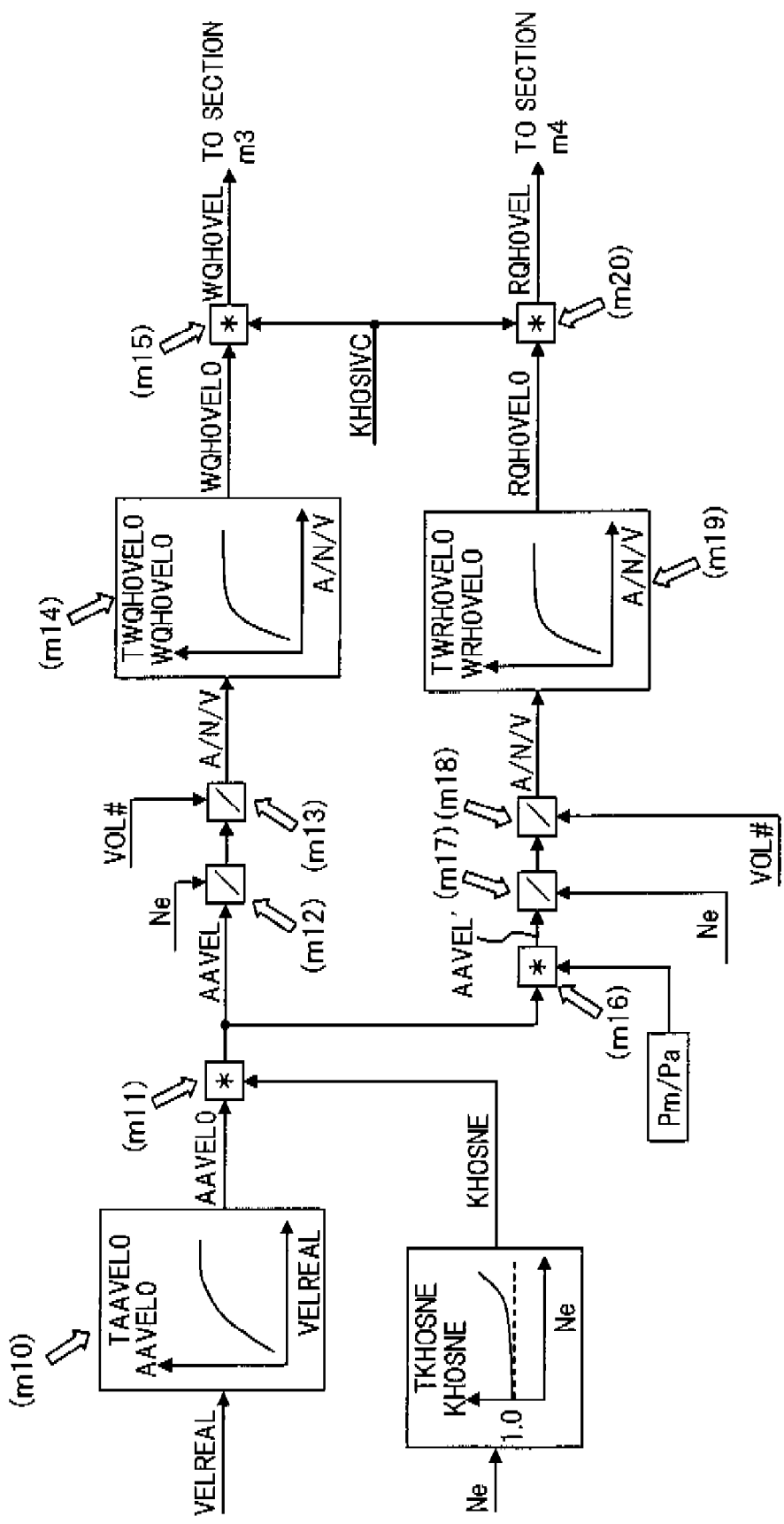
FIG. 18 is a block diagram illustrating processing for computing a volume-flow ratio in the first embodiment.

In a section m10, an opening area AAVEL0 of inlet valve 105 is computed by searching a table TAAVEL0 shown in FIG. 18 based on the angle VELREAL of control shaft 16 of variable valve lift mechanism 112.

The angle VELREAL corresponds to the control amount of variable valve lift mechanism 112.

In a section m11, similarly to the section G of FIG. 13, the opening area AAVEL0 is divided by correction value KHOSNE corresponding to the engine rotational speed NE in order to compute the required valve opening area AAVEL.

The computed required valve opening area AAVEL is divided by the engine rotational speed NE in a section m12, and then divided by the cylinder volume VOL# in a section m13.

In a section m14, a table TWHOVEL0 shown in FIG. 18 is searched to convert a state quantity [AAVEL/NE/VOL#] into a volume-flow ratio WHOVEL0.

In a section m15, similarly to the section E of FIG. 13, the volume-flow ratio WHOVEL0 is corrected by the correction value KHOSIVC, and the volume-flow ratio WQH0VEL is computed in fully opened throttle valve 103b and output to the section m3 of FIG. 17.

On the other hands in a section m11, the required valve opening area AAVEL computed by the section m11 is multiplied by a ratio [Pm/Pa] of an actual intake manifold pressure Pm and atmospheric pressure Pa in order to compute an opening area AAVEL'.

The opening area AAVEL' is divided by engine rotational speed NE in a section m17, and then divided by the cylinder volume VOL# in a section m18.

In a section m19, similarly to the section m14, the table TRH0VEL0 shown in FIG. 18 is searched to convert a state quantity [AAVEL'/NE/VOL#] into the volume-flow ratio RH0VEL0.

In a section m20, similarly to the section m15, the volume-flow ratio RH0VEL0 is corrected by the correction value KHOSIVC, and the actual volume-flow ratio RQH0VEL is computed and output to the section m4 of FIG. 17.

Hereinafter, the fuel injection control performed by control unit 115 will be described below.

In the first embodiment, fuel injection valve 121 is provided in inlet pipe 102 upstream of inlet valve 105.

Figure 33:
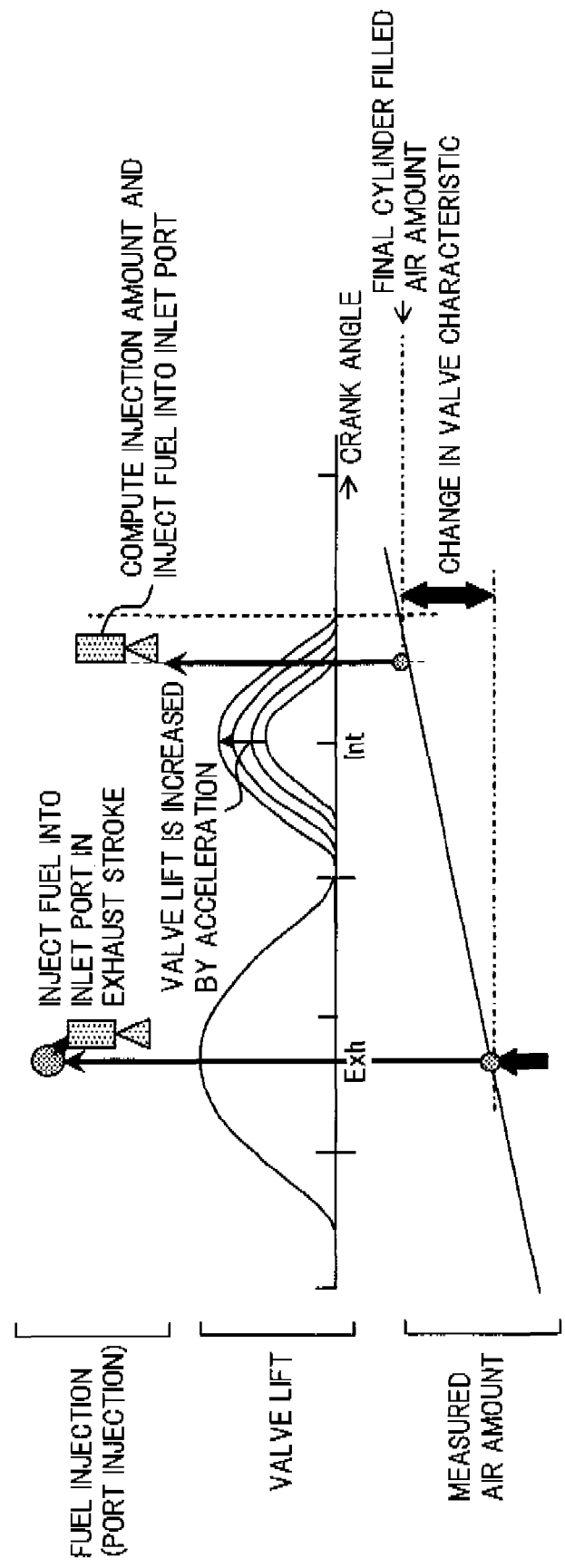
FIG. 33 is a diagram illustrating first injection timing and second injection timing in the first embodiment.

As shown in FIG. 33, fuel injection valve 121 injects the fuel while the fuel injection is divided per one cycle of each cylinder into first injection performed in an exhaust stroke and second injection performed in a second stage of an intake stroke.

The air fuel mixture is formed by the sum of the fuel injected in the exhaust stroke and the fuel injected in the intake stroke.

For example, the first injection in the exhaust stroke is performed in the middle of the exhaust stroke.

Injection start timing in each cylinder is detected based on the signals output from crank angle sensor 118 and cam angle sensor 119.

In the injection start timing set in the exhaust stroke, a first injection amount TI (ms) is computed, and an injection pulse having a pulse width corresponding to the first injection amount TI is output to fuel injection valve 121 provided in the cylinder in which the injection start timing comes, thereby performing the first injection.

As described in detail later, the first injection amount TI is computed from the following equation based on a basic fuel injection amount TP, a correction coefficient COEF, a first correction amount Tvelp, a second correction amount Tvels, a third correction amount TS, a fourth correction amount Tveli, and base amount Tveldef:

$$TI=TP \times COEF+Tvelp+Tvels+TS+Tveli-Tveldef:$$

Where base amount Tveldef is a base amount of a second injection amount that is injected in the second injection performed in the second stage of the intake stroke.

That is, the fuel amount in which the base amount Tveldef is subtracted from the fuel amount corresponding to the intake air amount in the first injection timing is injected in the first injection, and the remaining base amount Tveldef is injected in the second injection. The sum of the first injection amount injected in the first injection and the second injection amount injected in the second injection becomes an amount suitable to the intake air amount in a steady state, and the air fuel mixture having the target air fuel ratio is formed.

Figure 19:
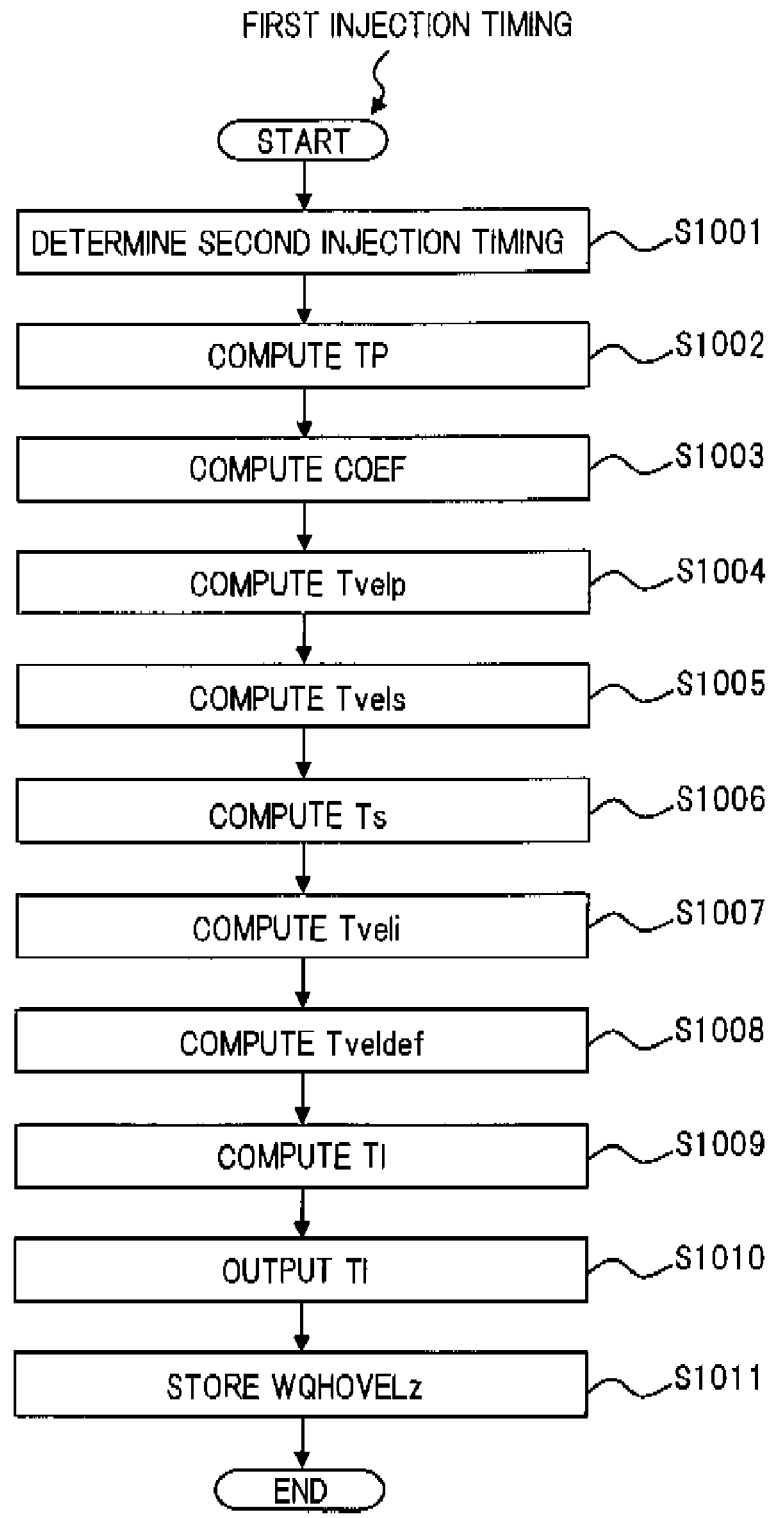
FIG. 19 is a flowchart illustrating processing for computing a first injection amount TI in the first embodiment.

FIG. 19 is a flowchart showing the first injection control performed in the exhaust stroke.

A routine of the flowchart of FIG. 19 is executed by interruption when crank angle sensor 118 detects the previously-set start timing of the first injection.

The first-injection start timing can be set at a fixed crank angle in the exhaust stroke or a crank angle in the exhaust stroke that is variably set from engine operating conditions such as an engine load, an engine rotational speed, and an engine temperature.

When the first-injection start timing comes to start the interrupt processing, start timing of the second injection performed in the second stage in the intake stroke after the first injection, is determined in Step S1001.

Figure 27:
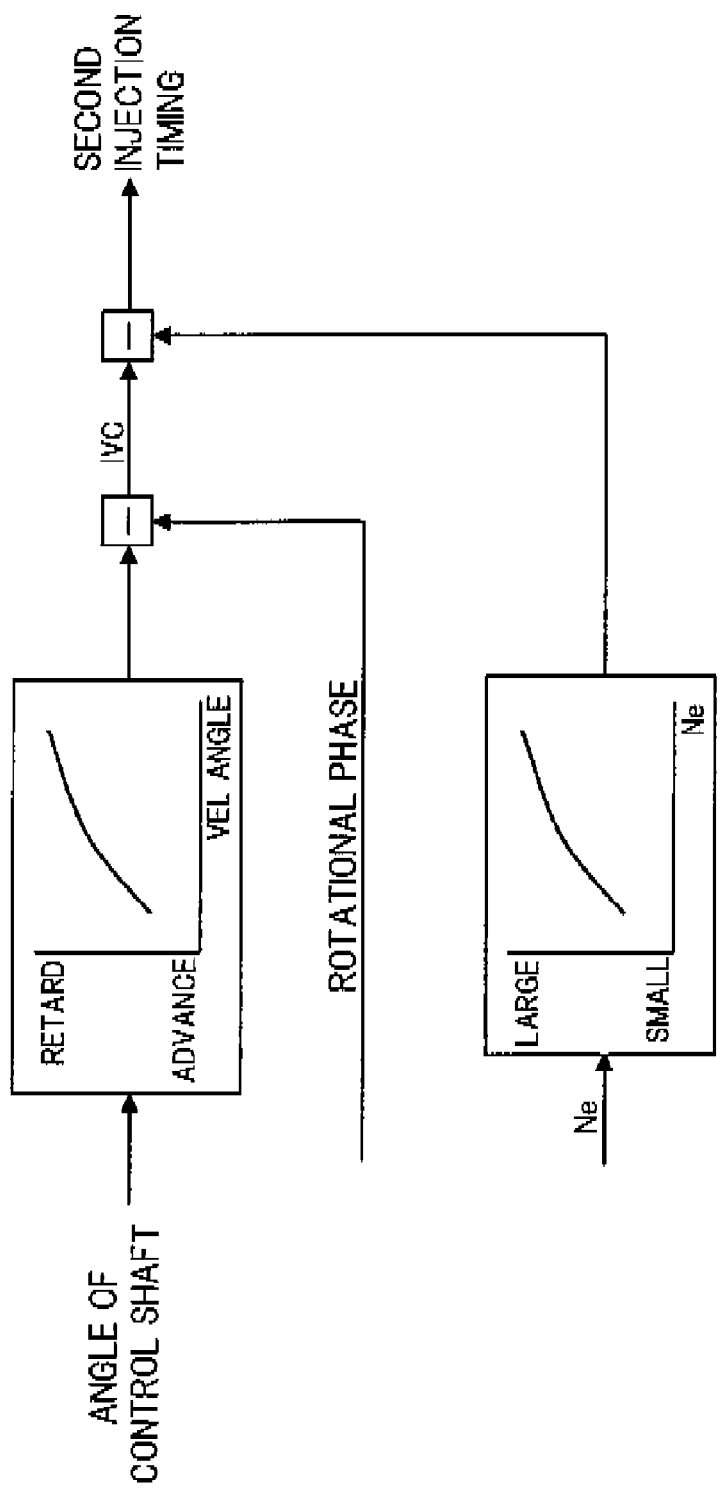
FIG. 27 is a block diagram illustrating processing for computing second injection start timing in the first embodiment.

Specifically, as shown in FIG. 27, assuming that variable valve timing mechanism 114 is controlled on the most retard angle side, the valve-closing timing IVC of inlet valve 105 is obtained from the angle of control shaft 16 of variable valve lift mechanism 112 at that time.

The valve-closing timing IVC is corrected by the advance angle amount of the rotational phase of inlet camshaft 113, performed by variable valve timing mechanism 114 at that time, whereby the valve-closing timing IVC of inlet valve 105 is obtained in the control states of variable valve lift mechanism 112 and variable valve timing mechanism 114 at that time.

The result in which the advance angle correction of the valve-closing timing IVC is performed by the correction value according to the engine rotational speed NE is set as the second-injection start timing.

In the start timing correction according to the engine rotational speed NE, as the engine rotational speed is increased, the crank angle advanced farther away from valve-closing timing IVC is set at the second-injection start timing.

In the first embodiment, because fuel injection valve 121 is provided upstream of inlet valve 105, the fuel can be supplied to combustion chamber 106 only when inlet valve 105 is opened, and a transport time is required until the fuel injected from fuel injection valve 121 is taken in combustion chamber 106.

Accordingly, in order that the fuel injected immediately before closing inlet valve 105 is taken in combustion chamber 106, it is necessary to Inject the fuel at a time back for the transport time from the valve-closing timing IVC of inlet valve 105.

The crank angle corresponding to the transport time becomes larger as the engine rotational speed NE is increased.

Therefore, as the engine rotational speed NE is increased, the second-injection start timing is set at the advance angle farther away from the valve-closing timing IVC of inlet valve 105.

When the valve-closing timing IVC of inlet valve 105 is obtained in Step S1001, an angle IVCANGz from the first-injection start timing to valve-closing timing IVC is obtained and stored.

The valve-closing timing IVC obtained in Step S1001 is a value that can be changed by the operation of variable valve lift mechanism 112 after the first injection.

In Step S1002, the basic fuel injection amount TP Is computed.

The basic fuel injection amount TP is computed from the following equation based on the engine rotational speed NE, the intake air amount Qa detected by airflow sensor 117, and a constant K:

$$TP=Qa/NE \times K$$

That is, the basic fuel injection amount TP is a total fuel amount that is required to form the air fuel mixture of the target air fuel ratio relative to the intake air amount measured at that time, and the basic fuel injection amount TP also indicates the engine load.

In Step S1003, the correction coefficient COEF is computed in order to correct the basic fuel injection amount TP.

The correction coefficient COEF is computed from the following equation based on a coefficient KAS that increases the fuel amount in starting engine 101 and immediately after starting engine 101, a coefficient KTW that increases the fuel amount when engine 101 has a low temperature, a coefficient KMR that increases the fuel amount in the high load and high rotational speed of engine 101, and a coefficient KHOT that increases the fuel amount when engine 101 has a high temperature:

$$COEF=KAS+KTW+KMR+KHOT$$

In Step S1004, the first correction amount Tvelp is computed in order to correct the basic fuel injection amount TP according to the change in fuel amount adhering to an inner wall of inlet pipe 102.

Figure 20:
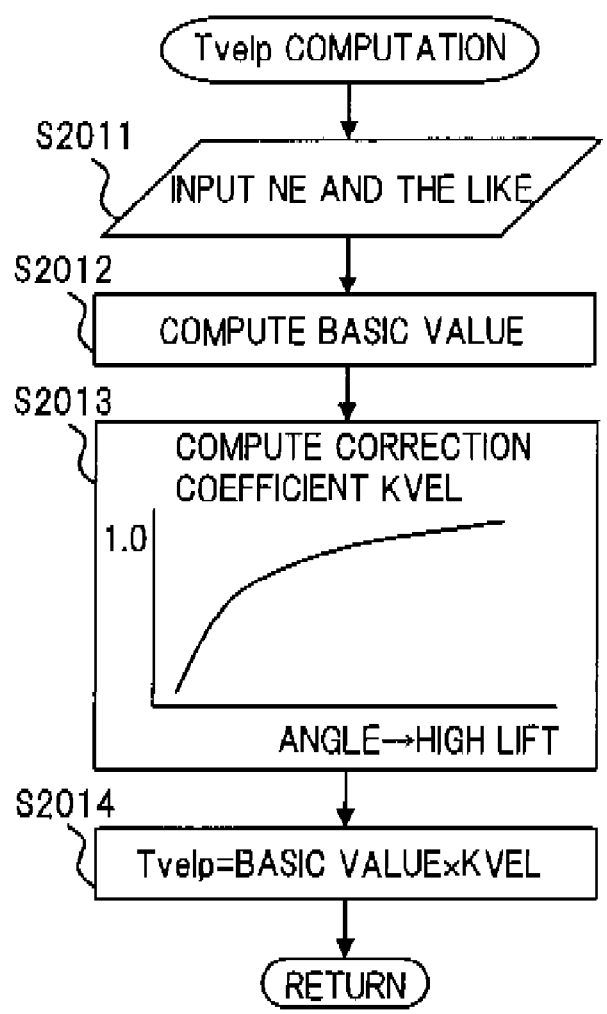
FIG. 20 is a flowchart illustrating processing for computing a correction amount Tvelp in the first embodiment.

FIG. 20 is a detailed flowchart showing processing for computing the first correction amount Tvelp.

In Step S2011, the engine rotational speed NE, the basic fuel injection amount TP, the water temperature TW, the throttle valve opening TVO, and the angle of control shaft 16 are input.

The basic fuel injection amount TP is a state quantity that represents the engine load.

In Step S2012, the basic value of the first correction amount Tvelp is computed based on the engine rotational speed NE, the basic fuel injection amount TP, the water temperature TW, and the throttle valve opening TVO.

Figure 21:
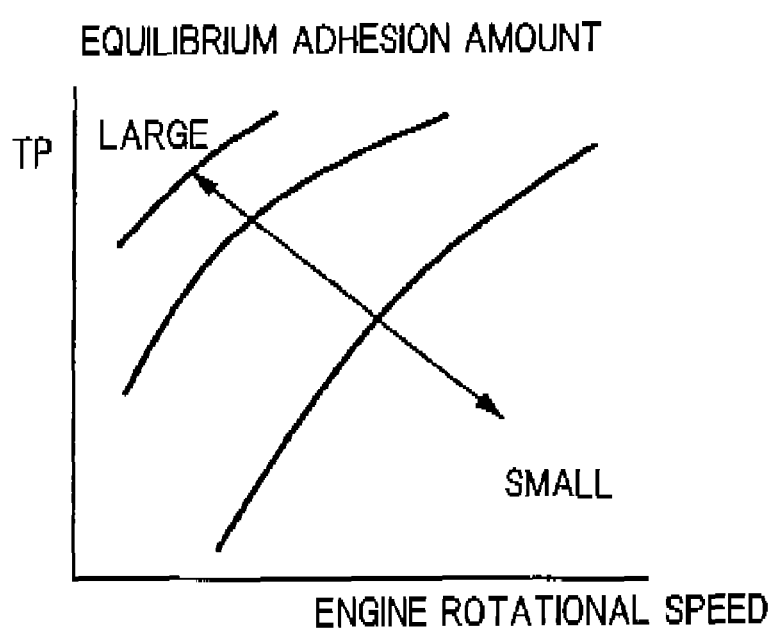
FIG. 21 is a graphical view illustrating a characteristic of an equilibrium adhesion amount in the inlet pipe in the first embodiment.

Specifically, as shown in FIG. 21, an equilibrium adhesion amount corresponding to the engine rotational speed NE and the basic fuel injection amount TP before operating an accelerator (immediately before transient operation) and an equilibrium adhesion amount corresponding to the engine rotational speed NE and the basic fuel injection amount TP after the accelerator is operated (during transient operation) are searched from a map in which the equilibrium adhesion amount in inlet pipe 102 is stored according to the engine rotational speed NE and the basic fuel injection amount TP.

The equilibrium adhesion amount is set larger, as the speed of engine 101 is decreased, and as the load of engine 101 is increased.

The basic value of the first correction amount Tvelp is computed by subtracting equilibrium adhesion amount before operating accelerator from equilibrium adhesion amount after operating accelerator.

Figure 22:
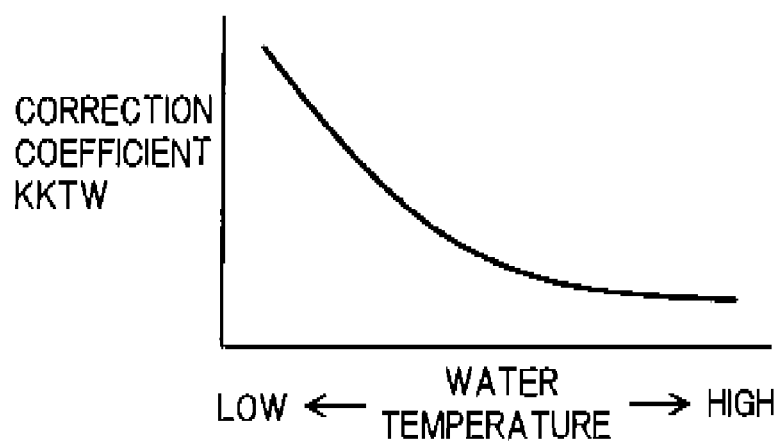
FIG. 22 is a graphical view illustrating a characteristic of a correction coefficient KKTW in the first embodiment.
Figure 23:
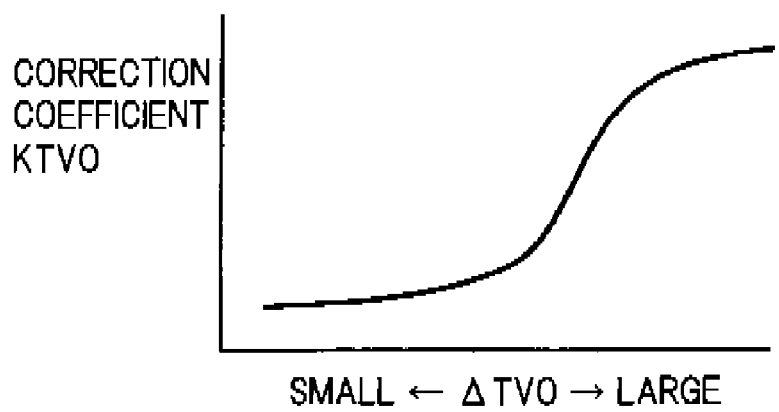
FIG. 23 is a graphical view illustrating a characteristic of a correction coefficient KTVO in the first embodiment.

On the other hand, the correction coefficient KKTW is set larger as the water temperature TW is lowered as shown in FIG. 22, and the correction coefficient KTVO is set larger as a change in speed ΔTVO of the throttle valve opening TVO is increased as shown in FIG. 23.

The basic value computed based on the equilibrium adhesion amount is corrected by the correction coefficient KKTW and the correction coefficient KTVO:

$$\text{basic value}=\text{basic value} \times KKTW \times KTVO$$

In Step S2013, a correction coefficient KVEL is set according to the angle of control shaft 16.

In the first embodiment, assuming that the valve lift amount of inlet valve 105 is increased as the angle of control shaft 16 is increased, the correction coefficient KVEL is equal to or smaller than 1.0 as shown in FIG. 20, and the correction coefficient KVEL is set larger as the angle of control shaft 16 is increased.

On the condition of the small valve lift amount, the intake air passed through inlet valve 105 has a high flow rate, and the fuel adhering to the wall surface of the inlet port near inlet valve 105 is easy to suck out to decrease the adhesion amount. Therefore, the correction coefficient KVEL corresponds to the condition of the small valve lift amount.

In Step S2014, the first correction amount Tvelp is computed from the following equation:

$$Tvelp=\text{basic value} \times KVEL$$

In Step S10057 the second correction amount Tvels is computed in order to correct the basic fuel injection amount TP according to the change in flow rate of the cylinder inner wall.

Figure 24:
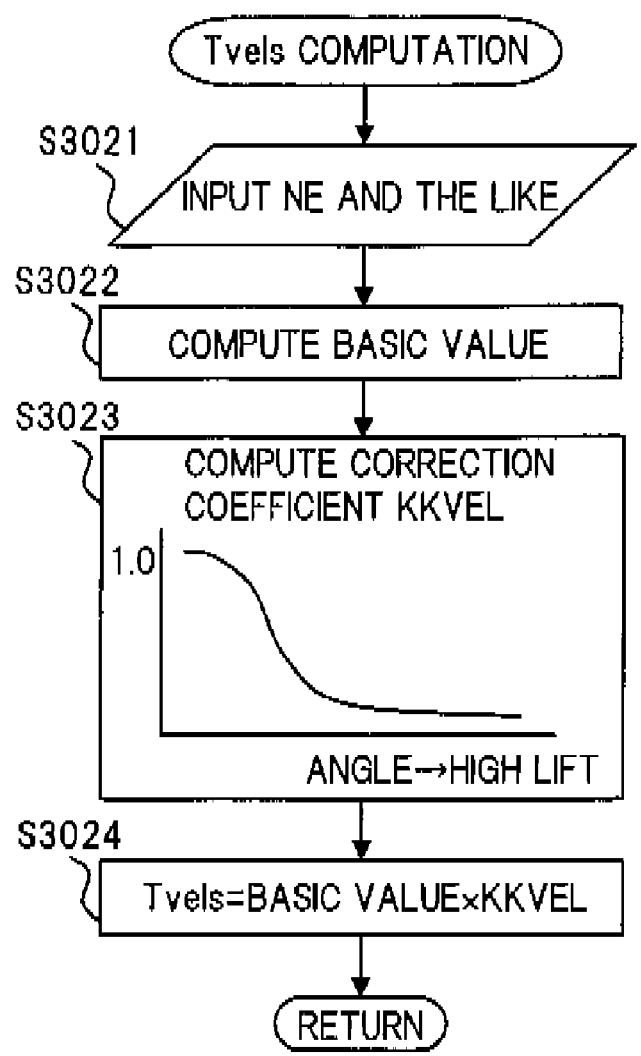
FIG. 24 is a flowchart illustrating processing for computing a correction amount Tvels in the first embodiment.

FIG. 24 is a detailed flowchart showing processing for computing the second correction amount Tvels.

In Step S3021, the engine rotational speed NE, the basic fuel injection amount TP, the water temperature TW, the throttle valve opening TVO, the angle of control shaft 16, and an elapsed time TAS from starting engine 101 are input.

In Step S3022, the basic value of the second correction amount Tvels is computed based on the engine rotational speed NE, the basic fuel injection amount TP, the water temperature TW, the throttle valve opening TVO, and the elapsed time TAS from starting engine 101.

Figure 25:
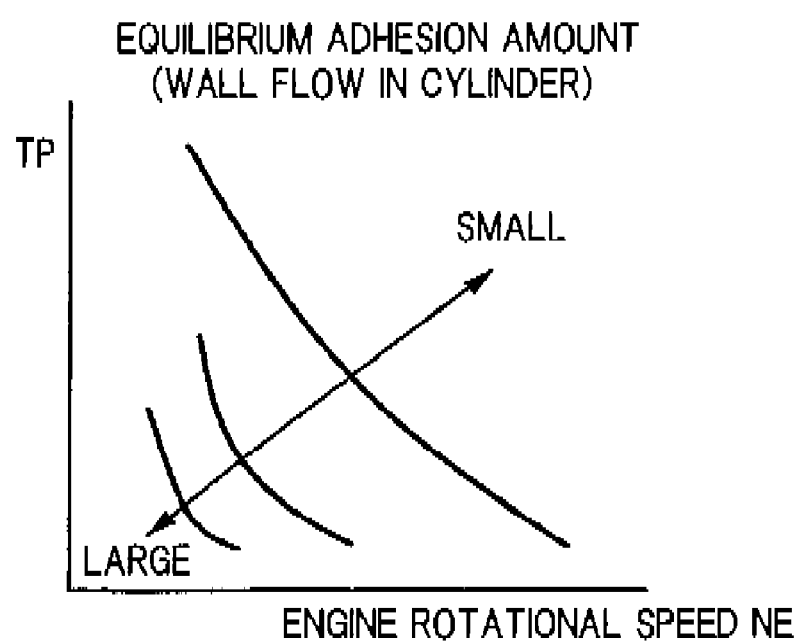
FIG. 25 is a graphical view illustrating a characteristic of an equilibrium adhesion amount in a cylinder in the first embodiment.

Specifically, as shown in FIG. 25, the equilibrium adhesion amount corresponding to the engine rotational speed NE and the basic fuel injection amount TP before operating the accelerator and the equilibrium adhesion amount corresponding to the engine rotational speed NE and the basic fuel injection amount TP after operating the accelerator are searched from a map in which an equilibrium adhesion amount of a wall flow in the cylinder is stored according to the engine rotational speed NE and the basic fuel injection amount TP.

In other words, the equilibrium adhesion amount of the wall flow in the cylinder immediately before the transient operation and the equilibrium adhesion amount of the wall flow in the cylinder in the transient operation are obtained.

The equilibrium adhesion amount of the wall flow in the cylinder is set larger, as the engine rotational speed NE is decreased, and as the The basic value of the second correction amount Tvels is computed by subtracting equilibrium adhesion amount after operating accelerator from equilibrium adhesion amount after operating accelerator.

On the other hand, the correction coefficient KKTW is set larger as the water temperature TW is lowered as shown in FIG. 22, and the correction coefficient KTVO is set larger as a change in speed ΔTVO of the throttle valve opening TVO is increased as shown in FIG. 23.

Figure 26:
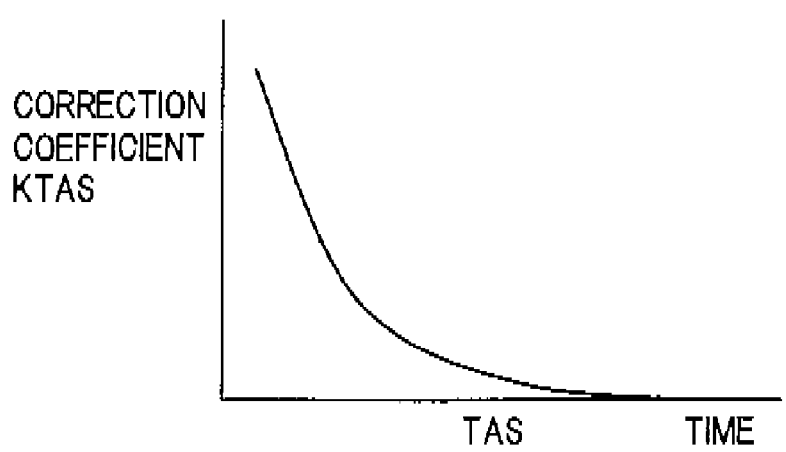
FIG. 26 is a graphical view illustrating a characteristic of a correction coefficient KTAS in the first embodiment.

A correction coefficient KTAS is set according to the elapsed time TAS from starting of the engine. As shown in FIG. 26, the correction coefficient KTAS is set smaller as the elapsed time TAS is lengthened.

The basic value of the second correction amount Tvels is corrected by the correction coefficient KKTW, the correction coefficient KTVO, and the correction coefficient KTAS:

$$basic\ value = basic\ value \times KKTW \times KTVO \times KTAS$$

In Step S3023, a correction coefficient KKVEL is set according to the angle of control shaft 16.

As shown in FIG. 24, the correction coefficient KKVEL is equal to or smaller than 1.0, and the correction coefficient KKVEL is set smaller as the angle of control shaft 16 is increased, that is, as the valve lift amount of inlet valve 105 is increased.

On the condition of the small valve lift amount of inlet valve 105, because the intake air passing through inlet valve 105 flows in a radial direction of Inlet valve 105, the amount of fuel adhering to the inside of the cylinder is increased.

Therefore, the correction coefficient KKVEL used to correct the basic value of the second correction amount Tvels is set larger as the valve lift amount of inlet valve 105 is decreased, and the fuel injection amount is increased when the inlet valve 105 has the small valve lift amount.

In Step S3024, the second correction amount Tvels is computed by the following equation:

$$Tvels = basic\ value \times KKVEL$$

Thus, in computing the first correction amount Tvelp and the second correction amount Tvels, the correction is performed according to the valve lift amount of inlet valve 105, so that the fuel injection amount can appropriately be corrected according to the change in wall flow rate caused by the change in valve lift amount. This enables the accuracy of air fuel ratio control to be improved in the transient operation of engine 101.

In Step S1006, the third correction amount TS is computed.

The third correction amount TS is a correction term that corrects a lack of injection amount caused by a delay of the opening of fuel injection valve 121, and the third correction amount TS is set larger as a power supply voltage at fuel injection valve 121 is lowered and as the delay time of the opening of fuel injection valve 121 is lengthened.

Because a battery equipped on the vehicle is used as the power supply of the fuel injection valve 121, the power supply voltage at fuel injection valve 121 is a voltage at the battery equipped on the vehicle.

In Step S1007, the fourth correction amount Tveli is computed.

In the first embodiment, the second Injection amount in the second injection at the second stage of the intake stroke is corrected based on the change in intake air amount generated by the operation of variable valve lift mechanism 112 after the first injection amount is computed.

However, as described above, because the second injection is performed at the second stage of the intake stroke, it is difficult that the fuel injected in the second injection is evenly distributed in combustion chamber 106 during the intake stroke. Accordingly, in order to form the homogeneous air fuel mixture in combustion chamber 106, desirably the fuel amount necessary to form the air fuel mixture having the target air fuel ratio is injected as much as possible in the first injection.

Therefore, when the fuel amount is computed as the correction amount corresponding to the change in intake air amount in the previous second injection, a constant ratio of the fuel amount is injected in the first injection of the next cycle, and the fuel amount that should be injected in the second injection is reduced.

The fourth correction amount Tveli is computed by the following equation based on a fifth correction amount Tintbas and a ratio Ra:

$$Tveli = Tintbas \times Ra$$

The fifth correction amount Tintbas corresponds to the change in intake air amount after the first injection, and the fifth correction amount Tintbas is computed in the injection start timing of the previous second injection.

The ratio Ra may be a fixed value, and the ratio Ra is set larger as engine 101 is accelerated more rapidly.

The fifth correction amount Tintbas is described in detail later.

In Step S1008, the base amount Tveldef in the second injection is computed according to the operating state of engine 101.

Figure 28:
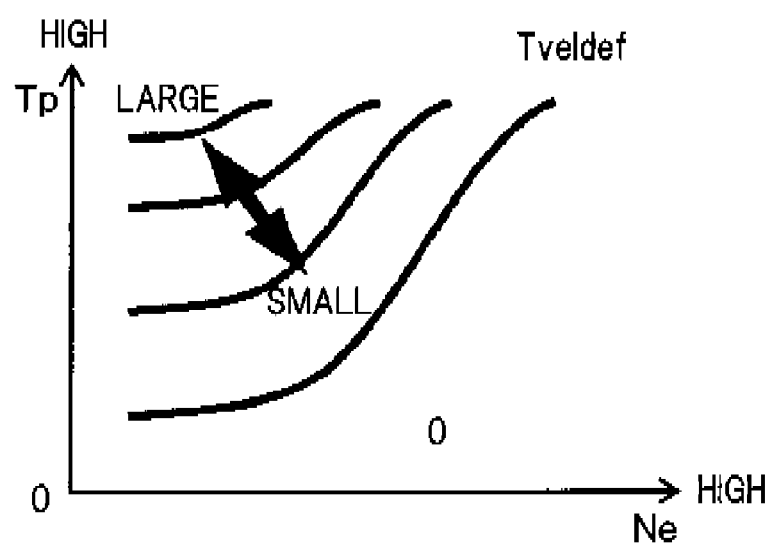
FIG. 28 is a graphical view illustrating a characteristic of a base amount Tveldef in the first embodiment.

As shown in FIG. 28, the base amount Tveldef is previously set according to the engine rotational speed NE and the basic fuel injection amount TP that represents the engine load. The base amount Tveldef is set larger as the engine rotational speed NE is decreased and as the engine load is increased, and the base amount Tveldef is set at zero in the low rotation speed and low load region, the intermediate and high rotation speed and low load region, and the high rotation speed and intermediate and high load region.

The region where the base amount Tveldef is set at zero is an operation region that is usually used in the steady operation, and the acceleration leads to an operation region where the base amount Tveldef is larger than zero.

Accordingly, the base amount Tveldef is set at a value larger than zero in the transient operation in which the intake air amount is changed after the first injection is performed, and base amount Tveldef is set at zero in the steady operation in which the intake air amount is not changed after the first injection is performed.

Base amount Tveldef can be set at different values in the acceleration and deceleration. Specifically, in the acceleration, the base amount Tveldef can be set at a value smaller than that in the deceleration.

When the intake air amount is decreased according to the deceleration, it is necessary that the decreased amount be previously ensured in the second injection in order to deal with the decrease in the intake air amount. On the other hand, in the acceleration, the fuel may be additionally injected according to the increase in intake air amount, and base amount Tveldef may be zero.

Even if the fuel is decreased in the second Injection timing, the fuel amount that can be decreased is limited to the base amount Tveldef at a maximum. In the small base amount Tveldef, even if the decrease in the second injection amount is maximized, the air fuel ratio possibly becomes rich only by the already-injected first injection amount.

Accordingly, the acceleration operation and the deceleration operation is distinguished from each other, the base amount Tveldef is set at zero or the minimum injection amount in the acceleration operation, the base amount Tveldef is set at a fixed value (>0) or a variable value corresponding to the engine load or engine rotational speed NE in the deceleration operation, and the base amount Tveldef in the deceleration operation is set larger than that in the acceleration operation.

The base amount Tveldef is increased as the deceleration is operated more rapidly, so that the base amount Tveldef can previously be increased when the change in decrease of the intake air amount becomes larger after the first injection.

A determination of the rapid deceleration can be made based on the state quantity correlated with a speed of the change in intake air amount such as an accelerator opening and an angular speed of control shaft 16.

In Step S1009, the first injection amount TI is computed from the following equation based on the computation results in Steps S1002 to S1008:

$$TI=TP \times COEF+Tvelp+Tvels+TS+Tveli-Tveldef$$

In Step S1010, the injection pulse signal having the pulse width corresponding to the first injection amount TI is output to fuel injection valve 121 provided in the cylinder at the first-injection start timing (exhaust stroke).

That is, when the injection start timing in the exhaust stroke comes, the first injection amount TI is computed and the injection of the first injection amount TI is immediately started.

The computation of the first injection amount TI is repeated at constant intervals, and the first injection can be performed based on the latest value of the first injection amount TI when the crank angle becomes a value corresponding to first injection timing.

In Step S1011, the latest value of the volume-flow ratio WQH0VEL is stored as the value WQH0VELz in the first injection.

The volume-flow ratio WQH0VEL is a value that is estimated based on the angle of control shaft 16 at that time, and accordingly corresponds to the intake air amount in the first injection timing.

Figure 29:
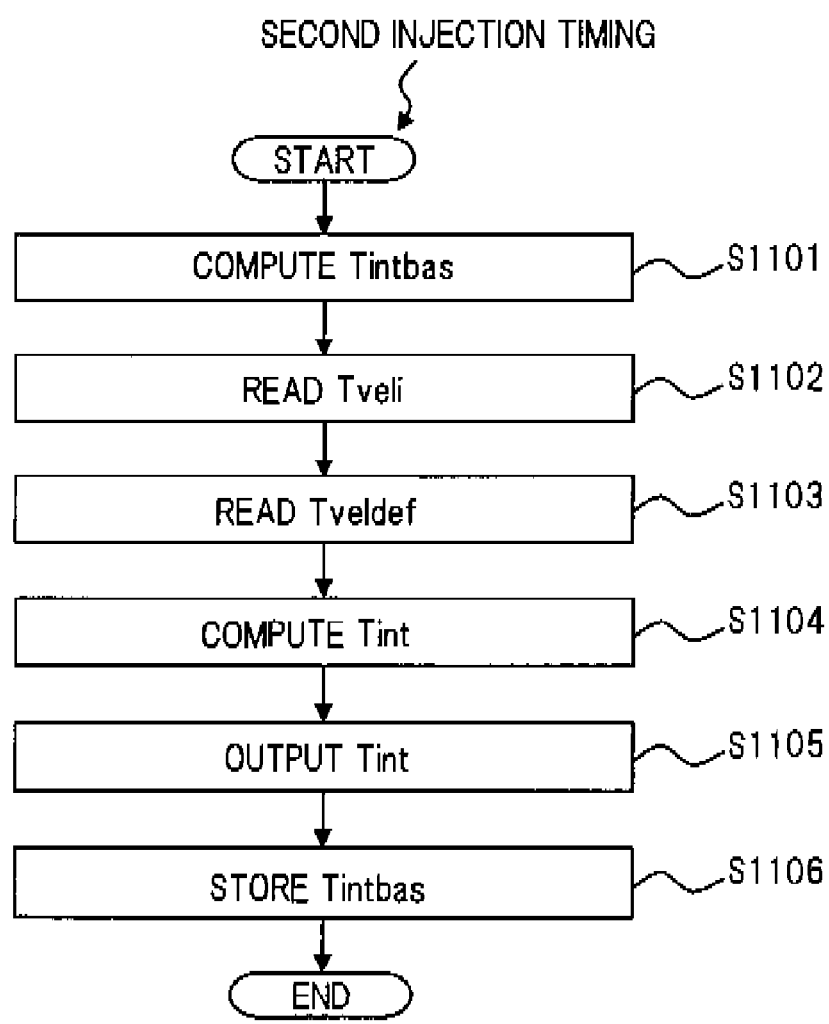
FIG. 29 is a flowchart illustrating processing for computing a second injection amount Tint in the first embodiment.

FIG. 29 is a flowchart showing a routine for controlling the second injection at the second stage of the intake stroke.

The routine of FIG. 29 is executed by interruption when the second-injection start timing computed in Step S1001 is detected based on the signal output from the crank angle sensor 118.

In Step S1101, fifth correction amount Tintbas corresponding to the change in intake air amount generated by the operation of variable valve lift mechanism 112 from the first-injection start timing is computed.

Because the first-injection start timing is timing in which the first injection amount TI in the first injection is determined, the fifth correction amount Tintbas is a fuel amount corresponding to the change in intake air amount from the timing in which the first injection amount TI in the first injection is determined.

In the steady state of engine 101, the first injection amount is set such that a fuel amount corresponding to the intake air amount at that time is decreased by the base amount Tveldef, and the second injection is performed only by the base amount Tveldef. Therefore, the sum of the first injection amount and the second injection amount is suitable to the intake air amount at that time.

However, when variable valve lift mechanism 112 is operated during a time period from the timing computing the first injection amount until inlet valve 105 is closed, the intake air amount is changed. Therefore, if the second injection is performed only by base amount Tveldef, the sum of the first injection amount and the second injection amount is not suitable to the intake air amount at that time.

Namely, when the control is performed so as to change the valve lift after the first injection amount is computed, the actual intake air amount is fixed at the time when inlet valve 105 is closed. Therefore, the required injection amount determined in the first injection may cause the excess or lack relative to the actual intake air amount.

To address this, in the first embodiment, determination of the change in intake air amount from the first-injection start timing is made by waiting until the last moment of the valve-closing timing of inlet valve 105 since the first injection, the second injection amount in the second injection is changed only by the change with respect to the intake air amount in the first-injection start timing, and the fuel amount that is suitable to the actual air amount taken in the cylinder is obtained by the sum of the first injection amount and the second injection amount.

For example, when the valve lift amount of inlet valve 105 is increased in the acceleration, because control shaft 16 is rotated in the lift increasing direction even after the first injection amount is determined, the intake air amount fixed at the time when inlet valve 105 is closed becomes larger than the intake air amount at the time when the first injection amount is determined. Therefore, the second injection amount is increased by fifth correction amount Tintbas corresponding to the increase in cylinder intake air amount such that the fuel suitable to the actual air amount is injected.

Because the second injection is performed immediately before the inlet valve 105 is closed, it is difficult that the fuel injected in the second injection is evenly distributed in the combustion chamber 106.

However, a large part of the required injection amount is injected in the first injection of the exhaust stroke, the fuel injected into the inlet port in the first injection is vaporized by heat of the inlet port, and the vaporized fuel is carried by the air flow in the intake stroke and evenly dispersed in combustion chamber 106. Accordingly, the air fuel mixture formed of the first injection and the second injection can be homogenized in combustion chamber 106.

The fifth correction amount Tintbas is computed as follows using the volume-flow ratio WQH0VEL computed according to the block diagram of FIG. 18.

A change in intake air amount DWQH0VEL from the first injection start timing is computed by the following equation based on the latest value of the volume-flow ratio WQH0VEL, the volume-flow ratio WQH0VELz computed in the first-injection start timing, and a gain GAIN obtained from the change in valve-closing timing IVC of inlet valve 105.

The latest value of the volume-flow ratio WQH0VEL corresponds to the intake air amount that is estimated from the control amount of variable valve lift mechanism 112 in the second-injection start timing.

$$DWQH0VEL=(WQH0VEL-WQH0VELz) \times GAIN$$

$$GAIN=IVCANG/IVCANGz$$

Where IVCANG is an angle from the crank angle at which the first injection is started to the valve-closing timing IVC of inlet valve 105 and IVCANG is a value based on the valve-closing timing IVC that is predicted according to the control states of variable valve lift mechanism 112 and variable valve timing mechanism 114 in the second-injection start timing, and IVCANGz is a value based on the valve-closing timing IVC that is predicted according to the control states of variable valve lift mechanism 112 and variable valve timing mechanism 114 in the first-injection start timing.

The valve-closing timing IVC that is predicted in the second-injection start timing is retarded with respect to the valve-closing timing IVC that is predicted in the first-injection start timing, and IVCANG becomes larger than IVCANGz. In such cases, the gain GAIN is set at a value larger than "1", On the other hand, the valve-closing timing IVC that is predicted in the second-injection start timing is advanced with respect to the valve-closing timing IVC that is predicted in the first-injection start timing, and IVCANG becomes smaller than IVCANGz. In such cases, the gain GAIN is set at a value smaller than "1".

The second-injection start timing is set based on the valve-closing timing IVC that is predicted according to the control states of variable valve lift mechanism 112 and variable valve timing mechanism 114 in the first-injection start timing. Accordingly, when the control states of variable valve lift mechanism 112 and/or variable valve timing mechanism 114 are changed to change the valve-closing timing IVC of inlet valve 105 until the second-injection start timing since the first-injection start timing, relative position between the second-injection start timing and the valve-closing timing IVC of inlet valve 105 is changed.

When the valve-closing timing IVC of inlet valve 105 is not changed after the first injection is started, the second injection timing is located immediately before closing inlet valve 105, and the volume-flow ratio WQH0VEL at that time indicates the intake air amount in the present intake stroke.

However, for example, when the valve-closing timing IVC of inlet valve 105 is retarded from the angle position that is predicted in the first-injection start timing, the second-injection start timing is advanced relative to the valve-closing timing IVC of inlet valve 105. Therefore, when the control states of variable valve lift mechanism 112 and variable valve timing mechanism 114 are continuously changed after the second injection timing, the volume-flow ratio WQH0VEL in the second injection timing indicates not the intake air amount in the present intake stroke but a midstream of the changing intake air amount.

It is assumed that the change in intake air amount generated by the operation of variable valve lift mechanism 112 until the second-injection start timing since the first-injection start timing is continued thereafter. When the change in air amount per unit of crank angle that is obtained by dividing [WQH0VEL-WQH0VELz] by IVCANGz is multiplied by the angle IVCANG, the change in air amount in the angle IVCANG, that is, the change in air amount until the valve-closing timing IVC of inlet valve 105 since the first-injection start timing is obtained.

Therefore, the change in intake air amount in angle IVCANG until the valve-closing timing IVC of inlet valve 105 since the first-injection start timing is obtained by multiplying the change in intake air amount "WQH0VEL-WQH0VELz" that is predicted from the change in control states of variable valve lift mechanism 112 until the second-injection start timing since the first-injection start timing by the gain GAIN.

Accordingly, even if the valve-closing timing IVC of inlet valve 105 is retarded by the increase in valve lift amount due to the acceleration while the second-injection start timing is relatively advanced from the valve-closing timing IVC, the change amount DWQH0VEL corresponding to the deviation between the intake air amount that is estimated from the control state of variable valve lift mechanism 112 in the first injection timing and the intake air amount that is suitable to the control state of variable valve lift mechanism 112 in the valve-closing timing IVC of inlet valve 105 can be obtained in the second-injection start timing.

Thus, the change amount DWQH0VEL that is of a volume flow rate is converted into a change amount DMASCYL that is of a mass flow rate using a coefficient AIRSPG:

$$DMASCYL = DWQH0VEL \times AIRSPG$$

The coefficient AIRSPG is computed by the following equation based on an intake air temperature and an intake manifold pressure:

$$AIRSPG = (1.293/(1+0.00367 \times \text{intake air temperature}(^\circ C.))) \times \text{intake manifold pressure}(kPa)/101.3(kPa)$$

The change amount DMASCYL is corrected based on a coefficient K that converts the intake air amount into the fuel injection amount corresponding to the target air fuel ratio and a correction coefficient HOSEI that is set according to the water temperature, and the corrected result is set as fifth correction amount Tintbas:

$$Tintbas = DMASCYL \times K \times HOSEI$$

Figure 30:
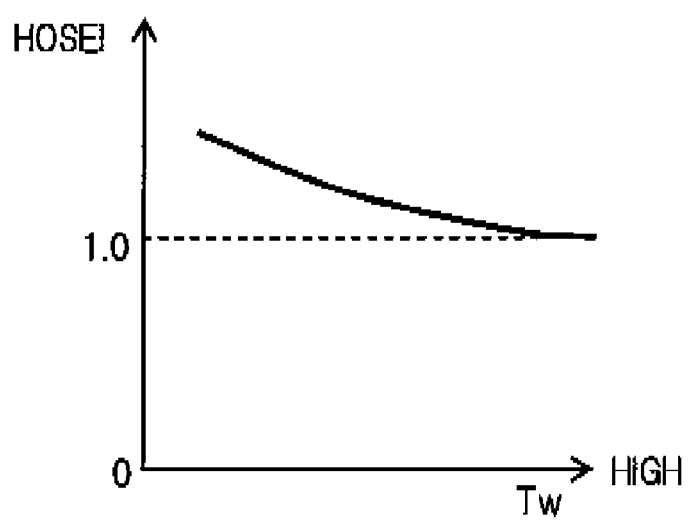
FIG. 30 is a graphical view illustrating a characteristic of a correction coefficient HOSEI in the first embodiment.

As shown in FIG. 30, the correction coefficient HOSEI is set at 1.0 when the cooling water temperature TW is hot, and the correction coefficient HOSEI is set at a value larger than 1.0 as the cooling water temperature TW is lowered.

In the increase correction with the correction coefficient HOSEI, similarly to the correction coefficient COEF in the first injection amount TI, the fifth correction amount Tintbas is increased as the cooling water temperature TW is lowered.

In Step S1102, the fourth correction amount Tveli set in Step S1007 is read, and in next Step S1103, the base amount Tveldef in the second injection set in Step S1008 is read.

In Step S1104, the second injection amount Tint is computed by the following equation:

$$Tint = Tveldef + TIntbas - Tveli$$

As described above, the fifth correction amount Tintbas corresponding to the change in air amount since the first injection amount is determined is added to the base amount Tveldef, and Tveli that is of the amount shared by the first injection amount in the fifth correction amount Tintbas is subtracted, thereby computing the second injection amount Tint.

That is, the fourth correction amount Tveli that is of a predetermined ratio of the fifth correction amount Tintbas obtained in the present second injection timing is added to the next first injection amount TI, and the second injection amount Tint is subtracted by the fourth correction amount Tveli added to the first injection amount TI, so that the sum of the first injection amount TI and the second injection amount Tint is not changed.

When the first injection amount TI is corrected by the fourth correction amount Tveli, in the state in which variable valve lift mechanism 112 is operated to continuously change the valve lift amount of inlet valve 105, the first injection amount is corrected while the increase in intake air amount after the first injection is previously expected. Therefore, the fuel amount injected in the second injection is relatively decreased.

Because the fuel injection is early performed to form the homogeneous air fuel mixture, the fuel amount injected in the first injection is increased as much as possible in the required fuel amount, thereby contributing to the homogeneity of the air fuel mixture.

For example, because the increase in cylinder intake air amount after the first injection is predicted from the operation speed of variable valve lift mechanism 112, the fourth correction amount Tveli is set according to the operation speed of variable valve lift mechanism 112. Therefore, the fuel amount injected in the first injection can be increased as much as possible.

When the second injection amount is relatively decreased, the fuel injected in the second injection can be taken in the cylinder before inlet valve 105 is closed. When the timing in which second injection amount Tint is determined is delayed as much as possible, the change in intake air amount can accurately be estimated until inlet valve 105 is closed.

However, in the case of the excessive fourth correction amount Tveli, possibly the first injection amount TI is excessively corrected when the transition is made from the transient operation in which the intake air amount is changed to the steady operation in which the intake air amount is hardly changed. Therefore, the ratio Ra is previously adjusted by an experiment or a simulation such that the first injection amount TI is not excessively corrected.

Although the ratio Ra is set as a fixed value, the ratio Ra may be set as a variable value based on the state quantity correlated with the speed of the change in intake air amount such as the speed of the change in accelerator opening and the angular speed of control shaft 16. In such cases, the ratio Ra is set larger on the condition that the speed of the change in intake air amount is increased.

Figure 31:
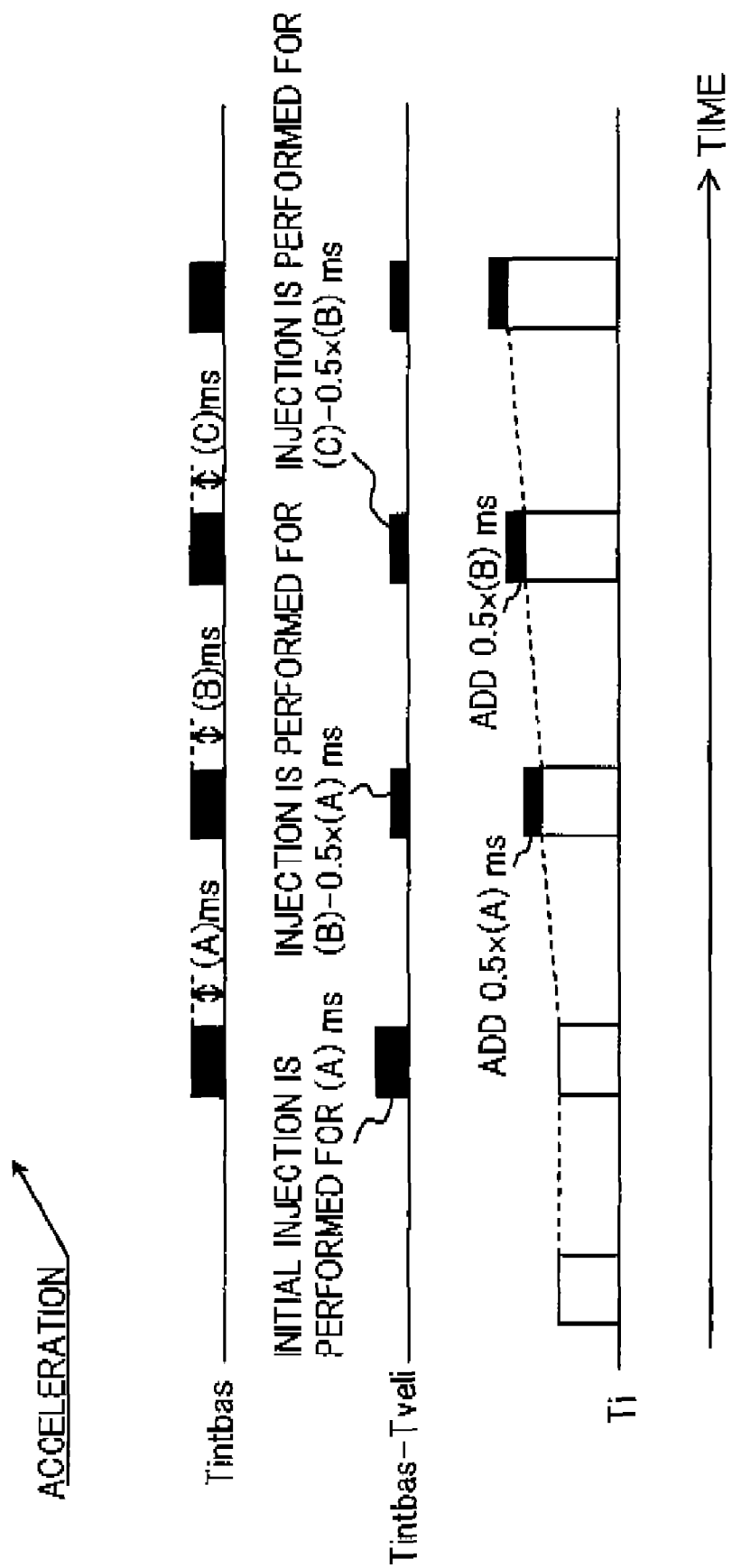
FIG. 31 is a timing chart illustrating a characteristic of an injection amount during acceleration in the first embodiment.

FIG. 31 shows the changes in first injection amount TI, the fifth correction amount Tintbas, and the fourth correction amount Tveli in the acceleration. At this point, the ratio Ra is set at 0.5.

In the acceleration, the second injection amount Tint is determined while the base amount Tveldef in the second injection is increased by the increase in intake air amount.

Specifically, when A (ms) (A>0) is computed as the fifth correction amount Tintbas in the second-injection start timing by starting the acceleration, the second injection amount Tint at that time is computed as follows:

$$Tint=Tveldef+A-0$$

A×0.5 is added to the next first injection amount TI. When B (ms) (B>0) is computed as the fifth correction amount Tintbas in the subsequent second-injection start timing, the second injection amount Tint at that time is computed as follow:

$$Tint=Tveldef+B-A\times0.5$$

Further, in the next first injection, B×0.5 is added to the first injection amount TI. When C (ms) (C>0) is computed as the fifth correction amount Tintbas in the subsequent second-injection start timing, the second injection amount Tint at that time is computed as follow:

$$Tint=Tveldef+C-B\times0.5$$

Figure 32:
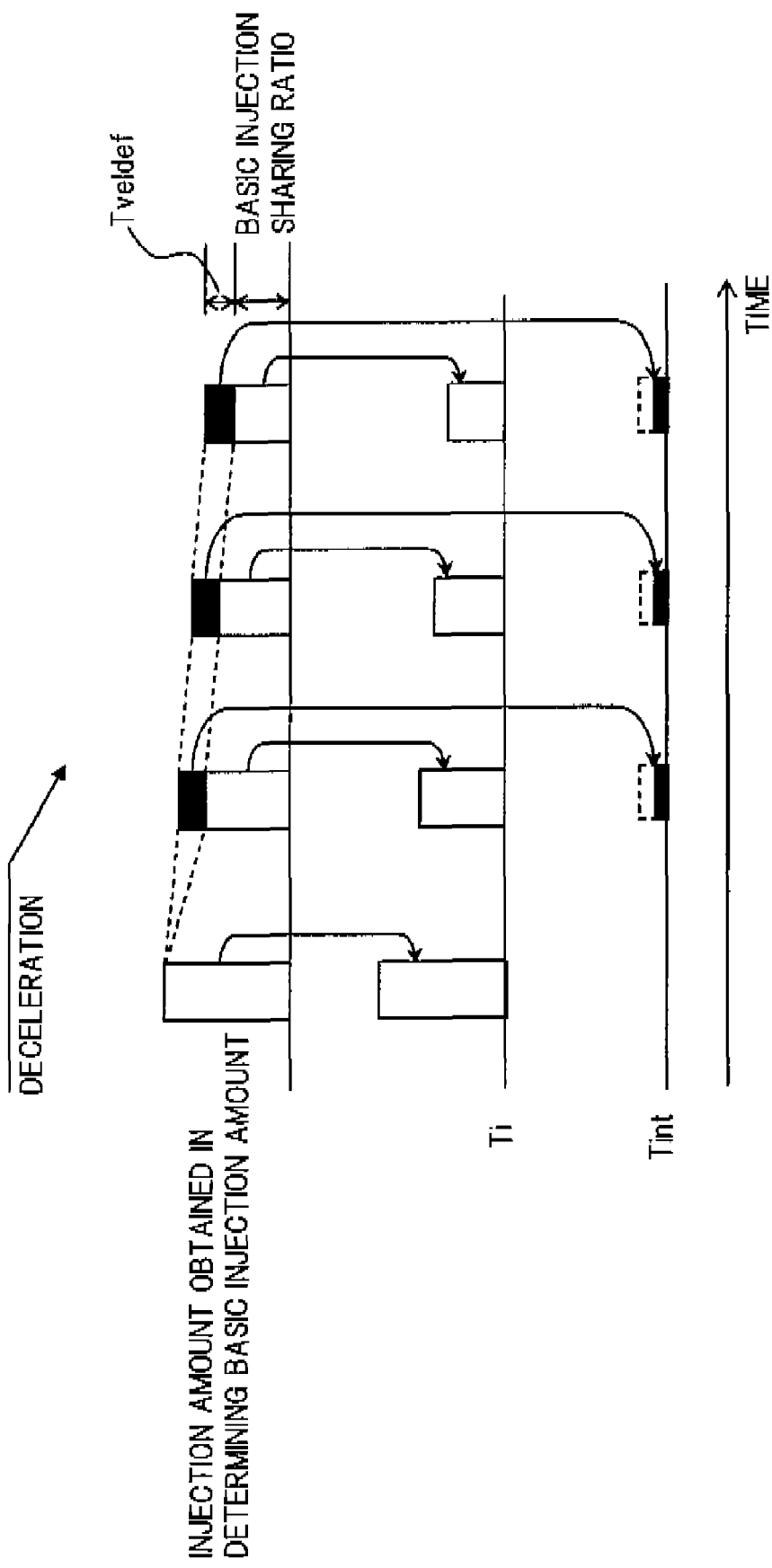
FIG. 32 is a timing chart illustrating a characteristic of the injection amount during deceleration in the first embodiment.

In the deceleration, as shown in FIG. 32, the base amount Tveldef in the second injection is decreased by the decrease in intake air amount. The injection amount of the sum of the first injection amount TI and the second injection amount Tint is decreased compared with the injection amount expected in the first injection.

Because the valve working angle is decreased according to the decrease in valve lift amount caused by the deceleration operation, the valve-closing timing IVC of inlet valve 105 is advanced in the deceleration operation, possibly inlet valve 105 is already closed in the second injection timing that is determined in the first-injection start timing.

In such cases, the second injection is not performed to decrease the fuel amount by the base amount Tveldef in the second injection, so that the injection of the fuel that becomes excessive by the deceleration can be prevented to enhance the accuracy of fuel injection amount control.

When the second injection amount Tint is computed in Step S1104, in Step S1105, the injection pulse signal having the pulse width corresponding to the second injection amount Tint is output to fuel injection valve 121 of the cylinder that is in the intake stroke at that time in order to start the fuel injection.

In Step S1106, the fifth correction amount Tintbas computed in the present time is stored in order to correct the next first injection amount TI based on the fifth correction amount Tintbas computed in the present time.

In the first embodiment, the second injection amount is corrected based on the change in intake air amount generated by the operation of variable valve lift mechanism 112 in the first-injection start timing, that is, until Inlet valve 105 is closed since the timing in which first injection amount Ti is computed.

Accordingly, even if variable valve lift mechanism 112 is operated to change the intake air amount until inlet valve 105 is closed since the first-injection start timing, the fuel suitable to the actual intake air amount can be injected to suppress deterioration of exhaust gas characteristic or the decrease in engine performance, which is caused by the deviation of the actual air fuel ratio from the required air fuel ratio.

When an abnormality is generated in the variable valve system, the second injection is stopped or the second injection amount is restricted to a limit value or less.

In cases where the second injection is stopped, the first injection amount TI is computed by the following equation:

$$TI=TP\times COEF+Tvelp+Tvels+TS$$

The abnormality of the variable valve system means the case in which a mechanical abnormality is generated in variable valve lift mechanism 112 or the case in which angle sensor 206 that detects the angle of control shaft 16 has a breakdown. The mechanical abnormality can be detected by divergence of the target valve lift or the large decrease in response speed of variable valve lift mechanism 112.

Because the injection amount is changed in the second injection by the response speed of variable valve lift mechanism 112, the limit value can be set according to the response speed at that time.

Thus, the injection amount in the second injection is restricted in the abnormality of the variable valve system, so that the generation of the air fuel ratio deviation caused by mistakenly setting the second injection amount can be restricted. Further, the prevention of the generation of the homogeneous air fuel mixture can be restricted in the second injection.

The base amount Tveldef is fixed to zero in the second injection, and the second injection that is of the additional injection in the acceleration can be performed based on the fifth correction amount Tintbas. Further, the corrections of the first injection amount TI and the second injection amount Tint with the fourth correction amount Tveli can be eliminated.

Desirably the second injection timing at the second stage of the intake stroke is performed as soon as possible in order to homogeneously distribute the fuel injected in the second injection in the combustion chamber. On the other hand, when the second injection amount computing timing is brought close to the closing timing of the inlet valve 105, the change in cylinder intake air amount generated by the operation of variable valve lift mechanism 112 can accurately be detected after the first injection. However, when the second injection timing is excessively brought close to the closing timing of the inlet valve 105, the whole of fuel injected in the second injection cannot be taken into the combustion chamber in the intake stroke at that time. Therefore, the second injection timing is set in consideration of the condition required for the above-described injection timing.

The second injection is performed only when the additional injection is required in the acceleration. In other cases except for the acceleration, the second injection is stopped, which allows the homogeneity to be improved In the air fuel mixture.

In the first embodiment, the change in intake air amount is detected after the first injection based on the change in volume-flow ratio WQH0VEL. Alternatively, the second injection amount may be determined based on the actual change in volume-flow ratio RQH0VEL, the change in angle of control shaft 16 of variable valve lift mechanism 112, and the change in operation amount of actuator 201.

The mechanism in which the valve lift amount is continuously variable is not limited to variable valve lift mechanism 112. For example, a brushless motor may be used as the actuator, and the second injection amount may be set from the control amount of the adopted variable valve mechanism or the change in operation amount.

In the first embodiment, the first injection is performed during the exhaust stroke. Alternatively, the first injection may be performed immediately after exhaust valve 107 is closed or at the beginning of the intake stroke.

The structure of variable valve lift mechanism 112 that is of the variable valve mechanism is not limited to the structure shown in FIGS. 2 to 4. Alternatively, a variable valve mechanism in which the intake air amount of the engine is controlled by the advance angle and retard angle of the closing timing of the inlet valve 105 may be used as variable valve lift mechanism 112.

With reference to the variable valve timing mechanism that controls the advance angle and retard angle of the closing timing of the inlet valve 105, a mechanism disclosed in Japanese Laid-Open (Kokai) Patent Application Publication No. 2003-269124 in which the advance angle and retard angle of the central phase of the valve working angle are controlled by a magnetic force of an electromagnetic retarder, a mechanism disclosed in Japanese Laid-Open (Kokai) Patent Application Publication No. 2003-184516 including a movable guide unit that is displaceably guided and engaged with a spiral guide, and a mechanism disclosed in Japanese Laid-Open (Kokai) Patent Application Publication No. 2008-025541 in which a camshaft is driven by a motor may appropriately be adopted in addition to the mechanism shown in FIG. 11.

For example, a mechanism disclosed in Japanese Laid-Open (Kokai) Patent Application Publication No. 2001-263015 may be used as the mechanism in which the valve lift amount is continuously variable.

The mechanism disclosed in Japanese Laid-Open (Kokai) Patent Application Publication No. 2001-263015 includes a slider gear that can be moved while operated simultaneously with the control shaft, an input arm that is driven by the cam of the camshaft, and an output arm that lifts an engine valve. The slider gear is moved in the axial direction while operated simultaneously with movement of the control shaft in the axial direction, and a relative position among the slider gear, the input arm, and the output arm is changed in the axial direction to relatively rotate the input arm and the output arm on the slider gear. Therefore, a relative phase difference between the input arm and the output arm is changed to continuously change the working angle and valve lift amount of the engine valve.

Further, the advance angle and retard angle of the second-injection start timing determined in the first-injection start timing can be corrected based on the change in the closing timing of the inlet valve 105 after the first injection.

For example, when the valve lift amount is increased in the acceleration after the first injection, the second injection timing is retarded from the time determined in the first injection according to the retarded change in the closing timing of the inlet valve 105 caused by the increase in valve lift amount. When the valve lift amount is decreased in the deceleration after the first injection, the second injection timing is advanced from the time determined in the first injection according to the advanced change in the closing timing of the inlet valve 105 caused by the decrease in valve lift amount.

Specifically, the second injection timing computation shown in FIG. 27 is repeated after the first injection, and the second injection timing can be determined by the comparison of the latest second injection timing and the crank angle at that time.

In consideration of the speed of the change in valve-closing timing, the second injection is performed in the earlier timing when the change toward the advance angle side has the high speed, and the second injection is performed in the later timing when the change toward the retard angle side has the high speed.

When the second injection timing is corrected in the above-described way, the large change of the relative position among the second injection timing and the inlet valve closing timing is suppressed, so that the change in intake air amount can stably be estimated after the first injection and the whole of fuel injected in the second injection can be taken into the cylinder in the intake stroke.

Then second and third embodiments will be described. The second and third embodiments are applied to an engine in which fuel injection valve directly injecting the fuel into the cylinder is provided in each cylinder.

Figure 34:
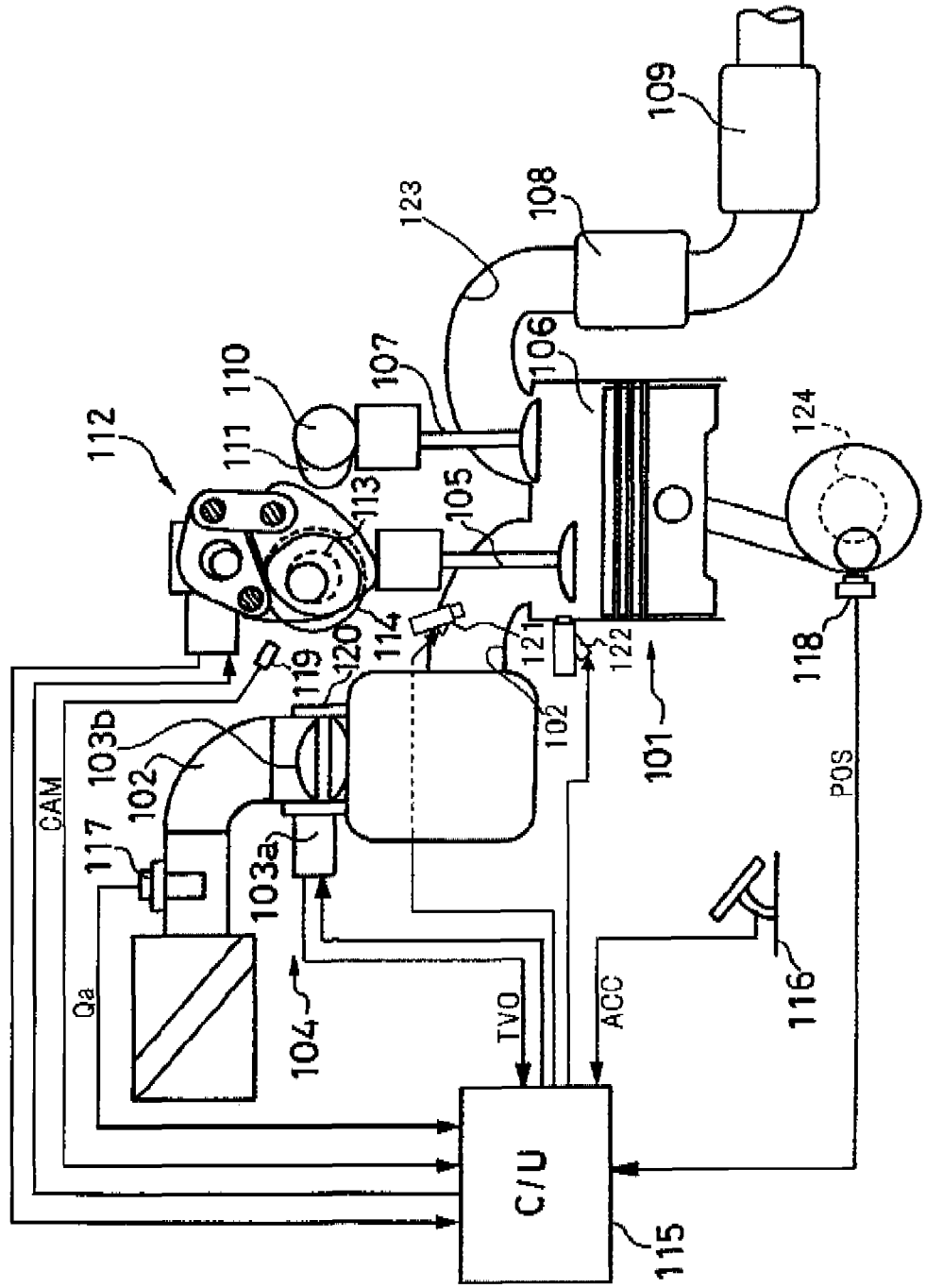
FIG. 34 is a diagram illustrating an engine according to a second embodiment of the present invention.

FIG. 34 shows a vehicular engine to which an apparatus for and a method of controlling a fuel injection according to the second embodiment are applied.

Engine 101 of FIG. 34 differs from engine 101 of FIG. 1 in that a fuel injection valve 121 and a fuel injection valve 122 are provided in each cylinder. Fuel injection valve 121 injects the fuel into the inlet pipe, and fuel injection valve 122 directly injects the fuel into the cylinder. In engine 101 of FIG. 34, because other configurations are identical to those of engine 101 of FIG. 1, the same component is designated by the same numeral, and the description is omitted.

Figure 35:
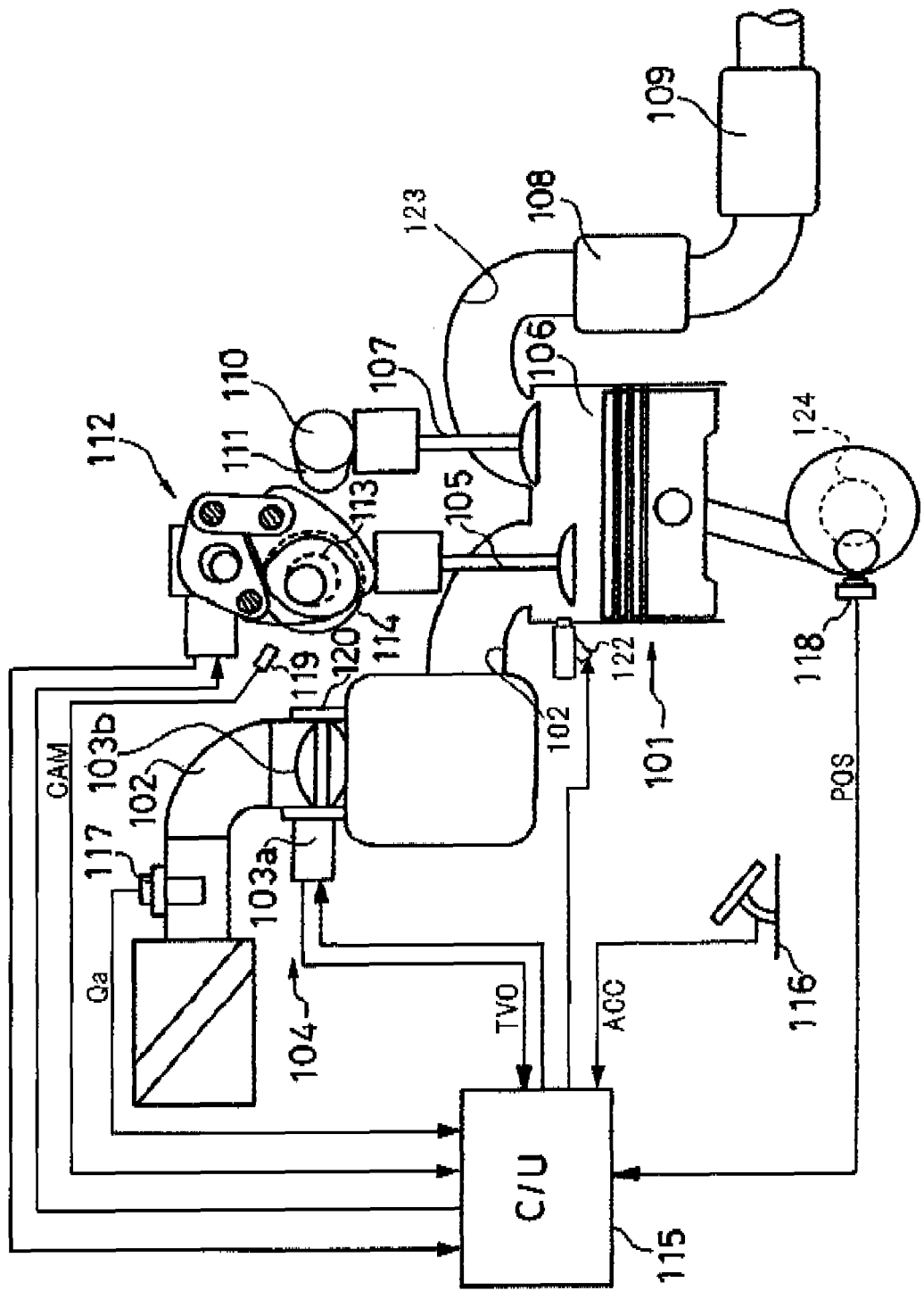
FIG. 35 is a diagram Illustrating an engine according to a third embodiment of the present invention.

On the other hand, engine 101 of the third embodiment shown in FIG. 35 differs from engine 101 of FIG. 1 in that fuel injection valve 122 directly injecting the fuel into the cylinder is provided in each cylinder, and no fuel injection valve 121 that injects the fuel into the inlet pipe is provided. In engine 101 of FIG. 35, because other configurations are identical to those of engine 101 of FIG. 1, the same component is designated by the same numerals and the description is omitted.

Thus, engine 101 of the second embodiment shown in FIG. 34 and engine 101 of the third embodiment shown in FIG. 35 differ from engine 101 of the first embodiment shown in FIG. 1 in the structure of the fuel injection valve. However, similarly to engine 101 of first embodiment shown in FIG. 1, each of engine 101 of second embodiment and engine 101 of third embodiment includes electronic control throttle 104, variable valve lift mechanism 112, and variable valve timing mechanism 114, and the structures of the variable valve lift mechanism 112 and variable valve timing mechanism 114 are similar to those of the first embodiment.

Accordingly, FIGS. 2 to 11 and the descriptions of FIGS. 2 to 11 are directly applied to the second and third embodiments.

Control unit 115 controls electronic control throttle 104, variable valve lift mechanism 112, and variable valve timing mechanism 114 in the same way as the first embodiment.

Accordingly, FIGS. 12 to 18 and the descriptions of FIGS. 12 to 18 are directly applied to the second and third embodiments.

The fuel injection control performed by control unit 115 in the second and third embodiments will be described below.

Figure 36:
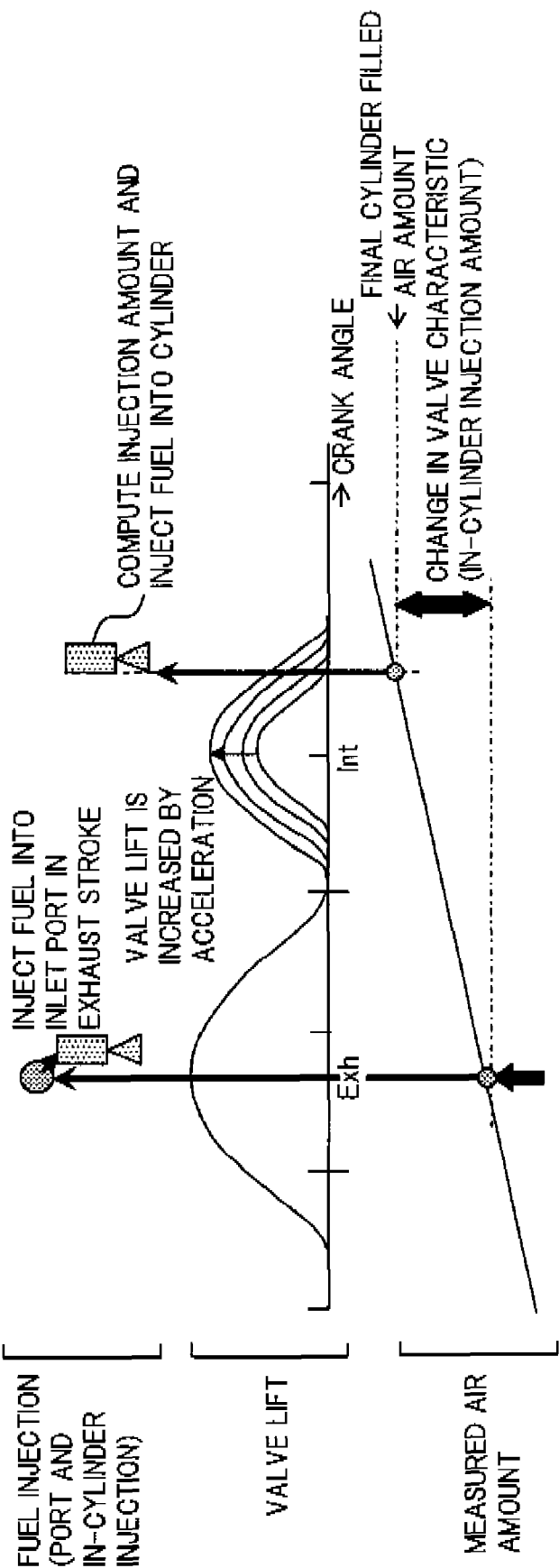
FIG. 36 is a diagram illustrating first injection timing and second injection timing in the second embodiment.

When each cylinder of vehicle engine 101 of the second embodiment includes fuel injection valve 121 that injects the fuel into the inlet pipe and fuel injection valve 122 that directly injects the fuel into the cylinder as shown in FIG. 34, the fuel injection is performed while divided into the first injection and the second injection per one cycle of each cylinder as shown in FIG. 36, and the air fuel mixture is formed by the sum of the fuel injected in the first injection and the fuel injected in the second injection. Fuel injection valve 121 performs the first injection in the exhaust stroke such as the midpoint of the exhaust stroke, and fuel injection valve 122 performs the second injection near the closing timing of the inlet valve 105.

The first injection timing performed by fuel injection valve 121 is not limited to the exhaust stroke, but the first injection timing may be the beginning of the intake stroke. However, the fuel is injected as soon as possible, and the vaporization of the fuel is promoted by utilizing the heat of inlet pipe 102, thereby evenly distributing the fuel in the combustion chamber.

Figure 37:
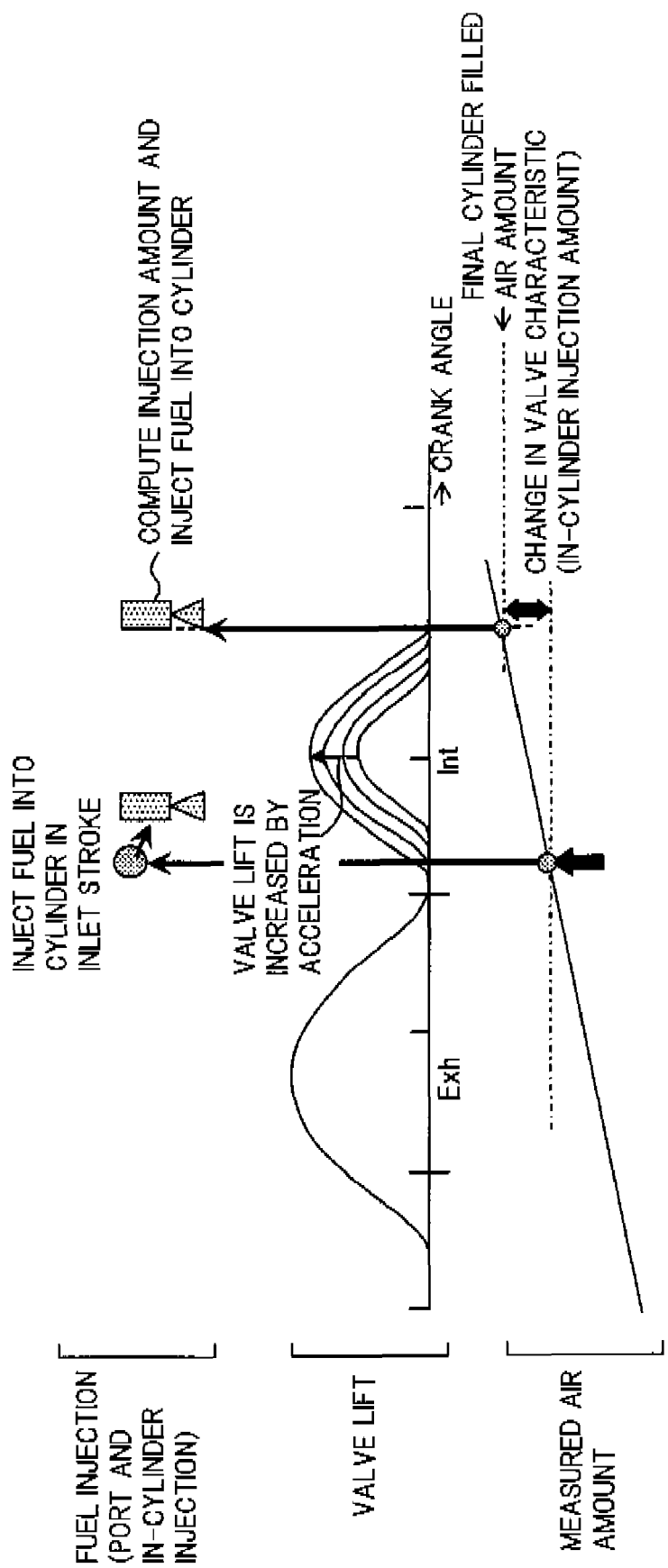
FIG. 37 is a diagram illustrating first injection timing and second injection timing in the third embodiment.

On the other hand, as shown in FIG. 35, in vehicle engine 101 of the third embodiment including only fuel injection valve 122 that directly injects the fuel into the cylinder, the fuel injection is performed while divided into the first injection and the second injection per one cycle of each cylinder as shown in FIG. 37, and the air fuel mixture is formed by the sum of the fuel injected in the first injection and the fuel injected in the second injection. Fuel injection valve 122 performs the first injection in the beginning of the intake stroke after the exhaust valve is closed, and fuel injection valve 122 also performs the second injection near the closing timing of the inlet valve 105.

In engine 101 of the third embodiment including not the fuel injection valve that injects the fuel into the inlet pipe but fuel injection valve 122 that directly injects the fuel into the cylinder, when fuel injection valve 122 performs the fuel injection in the exhaust stroke in which exhaust valve 107 is opened, the injected fuel is discharged through exhaust valve 107.

Accordingly, desirably the first injection is performed as soon as possible to evenly distribute the fuel in the combustion chamber. However, because the first injection can be performed after exhaust valve 107 is closed in engine 101 of the second embodiment, the first injection is performed immediately after exhaust valve 107 is closed.

As described above, fuel injection valve 122 performs the second injection near the closing timing of the Inlet valve 105 in the second and third embodiments. This is because the second injection is performed in order to change the sum of the injection amounts per one cycle according to the change in intake air amount caused by the change in inlet valve 105 opening characteristic after the first injection.

At this point, the intake air amount in the intake stroke is fixed at the closing timing of the inlet valve 105, so that the fuel injection amount can be obtained according to the actual intake air amount when the second injection amount is computed at the closing timing of the inlet valve 105, immediately before inlet valve 105 is closed, or after inlet valve 105 is closed.

On the other hand, although fuel injection valve 122 can perform the injection until just before the ignition, it is necessary that the injection be performed as soon as possible in order to form the even air fuel mixture. Therefore, desirably the injection amount is computed at the early stage and the injection is performed immediately after the injection amount is computed.

In the second and third embodiments, the injection amount in the second injection is computed near the closing timing of the inlet valve 105, and the injection is performed immediately after the injection amount is computed. This enables the injection amount to be accurately controlled to form the even air fuel mixture.

The first-injection start timing and second-injection start timing are detected based on the signals output from crank angle sensor 118 and cam angle sensor 119.

When the previously-set first-injection start timing comes, the first injection amount Ti is computed, and the injection pulse having the pulse width corresponding to the first injection amount Ti is supplied to the fuel injection valve provided in the cylinder in which the injection start timing comes, thereby performing the first injection.

In the second embodiment, the first-injection start timing is set in the exhaust stroke, the injection pulse having the pulse width corresponding to the first injection amount Ti is supplied to fuel injection valve 121, and the fuel injection valve 121 injects fuel into inlet pipe 102.

In the third embodiment, the first-injection start timing is set immediately after exhaust valve 107 is closed, the injection pulse having the pulse width corresponding to the first injection amount Ti is output to fuel injection valve 122, and fuel injection valve 122 directly injects the fuel into the cylinder.

In the second and third embodiments, the first injection amount Ti is computed in the way similar to that of the first embodiment, and FIGS. 19 to 29 and the descriptions of FIGS. 19 to 29 are directly applied.

However, in the second embodiment, as described above, the first-injection start timing is set at the fixed crank angle position in the exhaust stroke or the crank angle position that is variably set based on the engine operating conditions such as the engine load, the engine rotational speed, and the engine temperature until the beginning of the intake stroke since the exhaust stroke.

On the other hand, in the third embodiment, the first-injection start timing is set at the fixed crank angle position at the time exhaust valve 107 is closed or immediately after the closing timing of the exhaust valve 107.

When the first-injection start timing comes, the routine of FIG. 19 is performed.

When the routine of FIG. 19 is performed to cause the flow to go to Step S1001, the second injection timing is set based on the valve-closing timing IVC of inlet valve 105 as described above.

At this point, in the first embodiment, fuel injection valve 121 performs the second injection. On the other hand, in the second and third embodiments, because fuel injection valve 122 directly injects the fuel into the cylinder, it is not necessary that the injection be completed before the closing timing of the inlet valve 105.

Accordingly, in the second and third embodiments, the second injection timing can be set later than the first embodiment. However, as described above, because the homogeneity of the air fuel mixture is achieved by early performing of the second injection, the second injection timing is set at the closing timing of the inlet valve 105, immediately before inlet valve 105 is closed, or immediately after inlet valve 105 is closed.

Specifically, as shown in FIG. 27, assuming that the rotational phase that is variable by variable valve timing mechanism 114 is controlled at the most retard angle, the valve-closing timing IVC of inlet valve 105 is obtained from the angle of control shaft 16 of variable valve lift mechanism 112 at that time.

The valve-closing timing IVC is corrected according to the actual rotational phase controlled by variable valve timing mechanism 114, whereby the valve-closing timing IVC of inlet valve 105 is obtained.

In order that the angle position that is retarded farther away from the valve-closing timing IVC estimated at this time as the engine rotational speed NE is decreased is set at the second-injection start timing, the result in which the retard angle of the valve-closing timing IVC is corrected using the retard angle correction value corresponding to the engine rotational speed NE is set at the second-injection start timing.

In the case of the high engine rotational speed NE, because the time until the valve-closing timing IVC of inlet valve 105 since the first injection timing is short, the actual valve-closing timing IVC is not largely deviated from the valve-closing timing IVC of inlet valve 105 that is predicted in the first injection timing, even if the variable valve lift mechanism 112 changes the valve lift amount after the first injection timing.

On the other hand, in the case of the low engine rotational speed NE, because the time until the valve-closing timing IVC of inlet valve 105 since the first injection timing is long, possibly the actual valve-closing timing IVC is largely deviated from the valve-closing timing IVC of inlet valve 105 that is predicted in the first injection timing, when the variable valve lift mechanism 112 changes the valve lift amount after the first injection timing.

In the acceleration in which the valve lift amount is increased, the actual valve-closing timing IVC is largely retarded from the valve-closing timing IVC of inlet valve 105 that is predicted in the first injection timing. When the valve-closing timing IVC of inlet valve 105 that is predicted in the first injection timing is set at the second injection timing, actually the second injection is performed before the closing timing of the inlet valve 105.

The injection amount of the second injection is corrected according to the change in intake air amount generated by the operation of variable valve lift mechanism 112 after the first injection. However, as described above, when the angle position that is advanced from the actual valve-closing timing IVC is set at the second injection timing in the acceleration, the second injection amount is corrected according to the increase in intake air amount until at that time since the first injection timing. Accordingly, the fuel suitable to the intake air amount finally fixed at the closing timing of the inlet valve 105 cannot be injected, and the air fuel ratio becomes lean.

Particularly, in the acceleration in which the valve lift amount is increased, in order that the second injection timing is prevented from being set at the position that is largely advanced from the actual valve-closing timing IVC, the second injection timing is retarded larger as the engine rotational speed NE is decreased, so that the second injection timing can be set near the actual valve-closing timing IVC even if variable valve lift mechanism 112 increases the valve lift amount after the first injection timing.

In addition to or instead of the correction with engine rotational speed NE, the valve-closing timing IVC estimated from the manipulated variables of variable valve lift mechanism 112 and variable valve timing mechanism 114 is corrected based on information correlated with the speed change of the valve lift amount such as the speed of the change in accelerator opening, the speed of the change in target volume-flow ratio, and the speed of the change in target angle of the control shaft 16, and the correction result may be set at the second injection timing.

In the second and third embodiments, the computations of the first injection amount TI in Steps S1002 to S1010 are performed in the same way as the first embodiment.

That is, the first injection amount TI is computed by the following equation based on the basic fuel injection amount TP, the correction coefficient COEF, the first correction amount Tvelp, the second correction amount Tvels, the third correction amount TS, the fourth correction amount Tveli, and the second injection base amount Tveldef:

$$TI=TP \times COEF+Tvelp+Tvels+TS+Tveli-Tveldef$$

In the second embodiment, fuel injection valve 121 performs the first injection with the first injection amount TI in the exhaust stroke. In the third embodiment, fuel injection valve 122 performs the first injection with the first injection amount TI immediately after exhaust valve 107 is closed.

As shown in FIG. 34, in engine 101 of the second embodiment including fuel injection valve 122 and fuel injection valve 121, the first injection timing is set during the exhaust stroke, the first injection amount TI is computed when the first-injection start timing comes during the exhaust stroke, and fuel injection valve 121 immediately starts the injection with the first injection amount TI.

As shown in FIG. 35, in engine 101 of the third embodiment including fuel injection valve 122, the first injection timing is set immediately after exhaust valve 107 is closed, the first injection amount TI is computed when the first-injection start timing comes, and fuel injection valve 122 immediately starts the injection with the first injection amount TI.

In Step S1011, similarly to the first embodiment, the latest value of the volume-flow ratio WQH0VEL is stored as the value WQH0VELz in the first injection.

Similarly to the first embodiment, the second injection control in the second and third embodiments is performed according to the flowchart of FIG. 29.

When the second-injection start timing computed in Step S1001 is detected based on the signal output from crank angle sensor 118, similarly to the first embodiment, the fifth correction amount Tintbas that is of the injection amount corresponding to the change in intake air amount generated by the operation of variable valve lift mechanism 112 from the first-injection start timing is computed in Step S1101.

In the second and third embodiments, the second-injection start timing is set near the closing timing of the inlet valve 105, at which the cylinder intake air amount is finally fixed.

The intake air amount is determined in the second-injection start timing, and the second injection amount is corrected by the change in intake air amount until the second-injection start timing since the first injection timing, so that the fuel amount suitable to the actual air amount taken in the cylinder can be obtained by the sum of the first injection amount and the second injection amount.

For example, when the valve lift amount is increased in the acceleration, control shaft 16 is rotated in the direction in which the lift is increased even after the first injection amount is determined, and the intake air amount fixed at the time when inlet valve 105 is closed is increased compared with the intake air amount at the time when the first injection amount is determined. Therefore, the second injection amount is increased by the fifth correction amount Tintbas corresponding to the increase in intake air amount such that the fuel suitable to the actual Intake air amount is injected.

In the second and third embodiments, because the second injection is performed near the closing timing of the inlet valve 105, it is difficult that the fuel injected in the second injection is evenly distributed in combustion chamber 106. However, a large part of the injection amount is injected in the first injection in the exhaust stroke or immediately after the exhaust valve is closed, and the fuel is substantially evenly distributed in combustion chamber 106, so that the air fuel mixture formed in combustion chamber 106 can be homogenized by the first injection and the second injection.

Particularly, in the second embodiment in which fuel injection valve 121 performs the first injection in the exhaust stroke, the fuel spray evaporated by utilizing the heat of inlet pipe 102 is carried by the air flow in the intake stroke and evenly distributed in combustion chamber 106, so that the air fuel mixture formed in combustion chamber 106 can be homogenized by the first injection and the second injection.

In Step S1102, the fourth correction amount Tveli set in Step S1007 is read, and in Step S1103, the base amount Tveldef set in Step S1008 is read.

In Step S1104, the second injection amount Tint is computed by the following equation:

$$Tint = Tveldef + Tintbas - Tveli$$

As described above, the base amount Tveldef is corrected by the change in air amount Tintbas until inlet valve 105 is closed since the first injection amount TI is determined, the fourth correction amount Tveli that is shared by the first injection amount in the change in air amount Tintbas is subtracted from the base amount Tveldef to compute the second injection amount Tint.

Because the working angle of the inlet valve is decreased according to the decrease in valve lift amount due to the deceleration operation, the closing timing of the inlet valve 105 is advanced in the deceleration operation, and possibly inlet valve 105 is already closed in the second injection timing that is determined in the first-injection start timing.

However, In the second and third embodiments, the second injection is performed by fuel injection valve 122 that directly injects the fuel into the cylinder, so that the injected fuel can be combusted in the cycle even if the second injection is performed in the compression stroke.

When the second injection amount Tint is computed in Step S1104, in Step S1105, the injection pulse signal having the pulse width corresponding to the second injection amount Tint is output to fuel injection valve 122 of the cylinder in which the intake stroke is ended at that time, and the fuel injection is started.

In Step S1106, the fifth correction amount Tintbas computed in the present time is stored in order to correct the next first injection amount Ti based on the fifth correction amount Tintbas.

Thus, in the second and third embodiments, the second injection amount is corrected by the change in intake air amount generated by the operation of variable valve lift mechanism 112 until inlet valve 105 is closed since the first-injection start timing, so that the total fuel injection amount in the cycle can be corrected to the amount suitable to the actual air amount taken in the cylinder.

Therefore, even if variable valve lift mechanism 112 is operated until inlet valve 105 is closed since the first-injection start timing, the fuel substantially suitable to the actual intake air amount can be injected to prevent the deterioration of exhaust gas characteristic or the decrease in engine performance, which is caused by the air fuel ratio deviation.

In the second and third embodiments, when the abnormality is generated in the variable valve system, similarly to the first embodiment, the second injection is stopped or the second injection amount is restricted to the limit value or less.

The second injection may be stopped in the steady operation state or gradual acceleration or deceleration states. Even in the transient operation state, when the correction is not required because of the small change in intake air amount after the first Injection, or when the correction is substantially insignificant, the correction of the second injection amount corresponding to the change in intake air amount or the second injection may be stopped.

The first injection and the second injection are stopped on the fuel cut condition such as the deceleration. Preferably the computation of the second injection amount is continued in cutting the fuel, and the second injection is immediately resumed when the fuel injection is restarted.

The base amount Tveldef is fixed to zero, and the second injection may be performed as the additional injection In the acceleration based on the fifth correction amount Tintbas. Further, the corrections of the first and second injection amounts with the fourth correction amount Tveli may be eliminated.

The entire contents of Japanese Patent Application No. 2008-097013, filed Apr. 3, 2008 and Japanese Patent Application No. 2008-133957, filed May 22, 2008 are incorporated herein by reference.

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present inventions provided for illustration purpose only, and not for the purpose of limiting the invention as defined by the appended claims and their equivalents.

What is claimed is:

1. An apparatus for controlling fuel injection for an engine, which is provided with a fuel injection valve, an inlet valve and a variable valve mechanism that is configured to vary an opening characteristic of the inlet valve, the apparatus comprising:
    a required air amount computing unit configured to compute a required air amount based on an accelerator opening;
    a control amount computing unit configured to compute a control amount of the variable valve mechanism based on the required air amount;
    an injection control unit configured to provide fuel injection from the fuel injection valve by dividing the fuel injection into a first injection and a second injection subsequent to the first injection;
    an air amount computing unit that computes an intake air amount based on the control amount of the variable valve mechanism; and
    an injection amount computing unit configured to compute the second injection amount based on a deviation between the intake air amount computed by the air amount computing unit in a first injection amount computing timing of the first injection and the intake air amount computed by the air amount computing unit in a second injection amount computing timing of the second injection.

2. The apparatus according to claim 1, wherein the fuel injection valve injects the fuel on an upstream side of the inlet valve, and the injection control unit provides the second injection after the first injection and in a second stage of an intake stroke.

3. The apparatus according to claim 1, wherein the fuel injection valve directly injects the fuel into a cylinder, and the injection control unit provides the second injection after the first injection and near a valve-closing timing of the inlet valve.

4. The apparatus according to claim 1, wherein the fuel injection valve directly injects the fuel into a cylinder, the injection control unit provides the first injection in a first stage of an intake stroke after an exhaust valve is closed, and the injection control unit provides the second injection near a valve-closing timing of the inlet valve.

5. The apparatus according to claim 1, wherein the fuel injection valve comprises a first fuel injection valve and a second fuel injection valve, the first fuel injection valve injecting the fuel on an upstream side of the inlet valve, the second fuel injection valve directly injecting the fuel into a cylinder, the injection control unit provides the first injection from the first fuel injection valve during an exhaust stroke, and the injection control unit provides the second injection from the second fuel injection valve near a valve-closing timing of the inlet valve.

6. The apparatus according to claim 1, wherein the injection amount computing unit computes a base amount of the second injection amount based on whether the engine is in an acceleration state or a deceleration state, and the injection control unit corrects the base amount based on the deviation.

7. The apparatus according to claim 1, wherein the injection amount computing unit corrects the first injection amount in the next first injection by a predetermined proportion of a fuel injection amount based on the deviation, and the injection control unit corrects, according to the correction of the first injection amount, the second injection amount in the second injection after the first injection which is provided based on the corrected first injection amount.

8. The apparatus according to claim 1, wherein the injection amount computing unit computes a valve-closing timing of the inlet valve based on the control amount of the variable valve mechanism, sets the second injection amount computing timing based on the valve-closing timing computed in the first injection amount computing timing, corrects the deviation based on the valve-closing timing computed in the first injection amount computing timing and the valve-closing timing computed in the second injection amount computing timing, and computes the second injection amount based on the corrected deviation.

9. The apparatus according to claim 8, wherein the injection amount computing unit estimates the valve-closing timing of the inlet valve from the control amount of the variable valve mechanism in the first injection amount computing timing and the injection control unit sets a timing which is more retarded from the valve-closing timing of the inlet valve as an engine rotational speed is decreased at the time, as the second injection amount computing timing.

10. The apparatus according to claim 8, wherein the injection amount computing unit estimates the valve-closing timing of the inlet valve from the control amount of the variable valve mechanism in the first injection amount computing timing and the injection control unit sets a timing which is more advanced from the valve-closing timing of the inlet valve as the engine rotational speed is increased at the time, as the second injection amount computing timing.

11. The apparatus according to claim 1, wherein the injection amount computing unit is configured to change a share rate of the injection amount between the first injection and the second injection based on a change direction and a change speed of an opening characteristic of the inlet valve in the variable valve mechanism.

12. An apparatus for controlling fuel injection for an engine, which is provided with a fuel injection valve, an inlet valve and a variable valve mechanism that is configured to vary an opening characteristic of the inlet valve, the apparatus comprising:

a required air amount computing means for computing a required air amount based on an accelerator opening;

a control amount computing means for computing a control amount of the variable valve mechanism based on the required air amount;

an injection control means for providing fuel injection from the fuel injection valve by dividing the fuel injection into a first injection and a second injection subsequent to the first injection;

an air amount computing means for computing an intake air amount based on the control amount of the variable valve mechanism; and an injection amount computing means for computing the second injection amount based on a deviation between the intake air amount computed in the air amount computing means in a first injection amount computing timing of the first injection and the intake air amount computed in the air amount computing means in a second injection amount computing timing of the second injection.

13. A method of controlling a fuel injection for an engine, which is provided with a fuel injection valve, an inlet valve, and a variable valve mechanism that is configured to vary an opening characteristic of the inlet valve, the method comprising the steps of:

computing a required air amount based on an accelerator opening;

computing a control amount of the variable valve mechanism based on the required air amount;

computing a first injection amount;

providing a first injection from the fuel injection valve based on the first injection amount;

computing an intake air amount based on the control amount of the variable valve mechanism;

computing an intake air amount based on the control amount of the variable valve mechanism in a second injection amount computing timing subsequent to a first injection amount computing timing; and computing the second injection amount based on a deviation between the intake air amount estimated in the first injection amount computing timing and the intake air amount estimated in the second injection amount computing timing.

14. The method according to claim 13, wherein the step of computing the second injection amount comprises the steps of:
- computing a base amount of the second injection amount based on whether the engine is in an acceleration state or a deceleration state; and
- correcting the base amount based on the deviation.

15. The method according to claim 13, wherein the step of computing the first injection amount comprises the step of correcting the first injection amount in the next first injection by a predetermined proportion of a fuel injection amount based on the deviation, and
- the step of computing the second injection amount comprises the step of correcting, according to the correction of the first injection amount, the second injection amount in the second injection after the first injection which is provided based on the corrected first injection amount.

16. The method according to claim 13, further comprising the steps of:
- computing a valve-closing timing of the inlet valve based on the control amount of the variable valve mechanism in the first injection amount computing timing;
- setting the second injection amount computing timing based on the valve-closing timing; and
- computing a valve-closing timing of the inlet valve based on the control amount of the variable valve mechanism in the second injection amount computing timing,
- wherein the step of computing the second injection amount based on the deviation comprises the step of correcting the deviation based on the valve-closing timing computed in the first injection amount computing timing and the valve-closing timing computed in the second injection amount computing timing.

17. The method according to claim 16, wherein the step of setting the second injection amount computing timing comprises the steps of:
- detecting an engine rotational speed; and
- setting a timing, which is more retarded from the valve-closing timing of the inlet valve as the engine rotational speed is decreased at the time, as the second injection amount computing timing.

18. The method according to claim 16, wherein the step of setting the second injection amount computing timing comprises the steps of:
- detecting an engine rotational speed; and
- setting a timing which is more advanced from the valve-closing timing of the inlet valve as the engine rotational speed is increased at the time, as the second injection amount computing timing.

19. The apparatus according to claim 13, wherein the step of computing the second injection amount based on the deviation comprises the steps of:
- computing a change direction and a change speed of an opening characteristic of the inlet valve in the variable valve mechanism; and
- changing a share rate of the injection amount between the first injection and the second injection based on the change direction and the change speed.

* * * * *